US012608077B1

(12) United States Patent
Hol et al.

(10) Patent No.: US 12,608,077 B1
(45) Date of Patent: Apr. 21, 2026

(54) IN-VEHICLE TRACKING FOR EXTENDED REALITY

(71) Applicant: Snap Inc., Santa Monica, CA (US)

(72) Inventors: Jeroen Diederik Hol, Hengelo (NL); Matthias Kalkgruber, Vienna (AT); Scott Myers, Orange, CA (US); Simon Schreiberhuber, Vienna (AT)

(73) Assignee: Snap Inc., Santa Monica, CA (US)

( * ) Notice: Subject to any disclaimer, the term of this patent is extended or adjusted under 35 U.S.C. 154(b) by 272 days.

(21) Appl. No.: 18/208,556

(22) Filed: Jun. 12, 2023

(51) Int. Cl.
G06T 7/70     (2017.01)
G06F 3/01     (2006.01)
G06T 19/00    (2011.01)

(52) U.S. Cl.
CPC .............. G06F 3/012 (2013.01); G06T 7/70 (2017.01); G06T 19/006 (2013.01); *G06T 2207/30244* (2013.01); *G06T 2207/30268* (2013.01)

(58) Field of Classification Search
CPC ......... G06F 3/012; G06T 7/70; G06T 19/006; G06T 2207/30244; G06T 2207/30268
See application file for complete search history.

(56) References Cited

U.S. PATENT DOCUMENTS 10,948,299 B1 *  3/2021  Zhang ................ G01C 21/1656
2023/0048398 A1 *  2/2023  Mounier ................ G06F 3/011

OTHER PUBLICATIONS

Mark McGill et al.. 2022. PassengXR: A Low Cost Platform for Any-Car, Multi-User, Motion-Based Passenger XR Experiences. In Proceedings of the 35th Annual ACM Symposium on User Interface Software and Technology (UIST '22).Association for Computing Machinery, NY Article 2, 1-15 (Year: 2022).*
Tang, Baihui, "A Review of VSLAM Technology Applied in Augmented Reality", IOP Conf. Series: Materials Science and Engineering 782, (2020), 11 pgs

* cited by examiner

*Primary Examiner* — Said Broome
(74) *Attorney, Agent, or Firm* — Schwegman Lundberg & Woessner, P.A.

(57) ABSTRACT
Examples disclosed herein describe visual-inertial tracking techniques for extended reality (XR) devices. According to some example methods, an XR device is located in, and movable relative to, a vehicle. The XR device generates device tracking data and accesses vehicle tracking data. The vehicle tracking data is generated by an external sensor configured to measure motion of the vehicle. Consolidated tracking data is generated based on the device tracking data and the vehicle tracking data. In some examples, a pose of the XR device is determined by using the consolidated tracking data.

20 Claims, 12 Drawing Sheets

214

IN-VEHICLE TRACKING FOR EXTENDED REALITY

TECHNICAL FIELD

The subject matter disclosed herein relates to extended reality (XR) devices, and particularly, but not exclusively, to visual-inertial tracking in the context of XR devices.

BACKGROUND

An augmented reality (AR) device enables a user to observe a real-world scene while simultaneously seeing virtual content that may be aligned to objects, images, or environments in the field of view of the AR device. A virtual reality (VR) device provides a more immersive experience than an AR device. The VR device blocks out the field of view of the user with virtual content that is displayed based on a position and orientation of the VR device. In general, AR and VR devices are referred to herein as XR devices.

Many XR devices include visual-inertial tracking systems. A visual-inertial tracking system combines data from visual and inertial sensors to enable robust tracking. For example, a visual-inertial tracking system may utilize images captured by a camera of the XR device and motion data from an Inertial Measurement Unit (IMU) of the XR device in order to track the pose (position and orientation) of the XR device.

BRIEF DESCRIPTION OF THE SEVERAL VIEWS OF THE DRAWINGS

In the drawings, which are not necessarily drawn to scale, like numerals may describe similar components in different views. To identify the discussion of any particular element or act more easily, the most significant digit or digits in a reference number refer to the figure number in which that element is first introduced. Some non-limiting examples are illustrated in the figures of the accompanying drawings in which.

DETAILED DESCRIPTION

Figure 1:
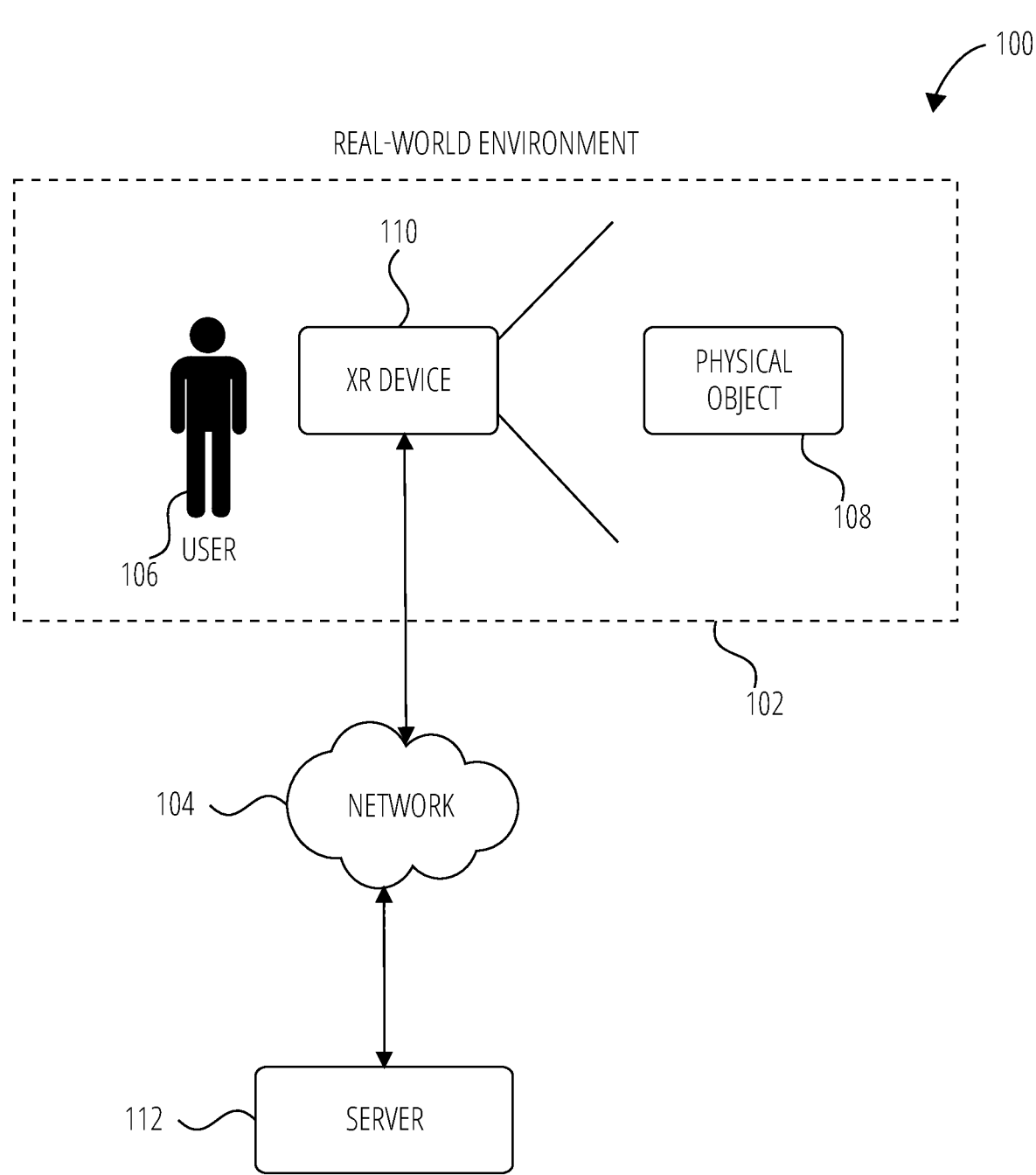
FIG. 1 is a diagrammatic illustration of a network environment for operating an XR device, according to some examples.

The description that follows describes systems, methods, techniques, instruction sequences, and/or computing machine program products that illustrate examples of the present subject matter. In the following description, for purposes of explanation, numerous specific details are set forth in order to provide an understanding of various examples of the present subject matter. It will be evident, however, to those skilled in the art, that examples of the present subject matter may be practiced without some or other of these specific details. Examples merely typify possible variations. Unless explicitly stated otherwise, structures (e.g., structural components) are optional and may be combined or subdivided, and operations (e.g., in a procedure, algorithm, or other function) may vary in sequence or be combined or subdivided.

The term "augmented reality" (AR) is used herein to refer to an interactive experience of a real-world environment where physical objects or environments that reside in the real world are "augmented" or enhanced by computer-generated digital content (also referred to as virtual content or synthetic content). Digital content rendered in this manner may thus be referred to as "augmentations." The term "AR" can also refer to a system that enables a combination of real and virtual worlds, real-time interaction, and three-dimensional registration of virtual and real objects. A user of an AR system can perceive virtual content that appears to be attached or interact with a real-world physical object. The term "AR application" is used herein to refer to a computer-operated application that enables an AR experience.

The term "virtual reality" (VR) is used herein to refer to a simulation experience of a virtual world environment that is completely distinct from the real-world environment. Computer-generated digital content is displayed in the virtual world environment. The term "VR" also refers to a system that enables a user to be completely immersed in the virtual world environment and to interact with virtual objects presented in the virtual world environment. While examples described in the present disclosure focus primarily on AR devices and AR applications, it will be appreciated that aspects of the present disclosure may be applied to other XR technology, such as VR devices and VR applications.

The term "Inertial Measurement Unit" (IMU) is used herein to refer to a sensor or device that can report on the inertial status of a moving body, including one or more of the acceleration, velocity, orientation, and position of the moving body. In some examples, an IMU enables tracking of movement of a body by integrating the acceleration and the angular velocity measured by the IMU. The term "IMU" can also refer to a combination of accelerometers and gyroscopes that can determine and quantify linear acceleration and angular velocity, respectively. The values obtained from one or more gyroscopes of an IMU can be processed to obtain data including the pitch, roll, and heading of the IMU and, therefore, of the body with which the IMU is associated. Signals from one or more accelerometers of the IMU also can be processed to obtain data including velocity and/or displacement of the IMU and, therefore, of the body with which the IMU is associated.

The term "SLAM" (Simultaneous Localization and Mapping) is used herein to refer to a technique used to understand and map a physical environment in real-time. A SLAM system uses sensors such as cameras, depth sensors, and IMUs to capture data about the environment, and then uses that data to create a map of the surroundings of a device while simultaneously determining the location of the device within that map. This allows, for example, an XR device to accurately place virtual content, such as digital objects, in the real world, and track the position of objects as a user moves and/or as the objects move.

The term "VIO" (Visual-Inertial Odometry) is used herein to refer to a technique that combines data from an IMU and a camera to estimate the pose of an object in real-time. The term "pose" refers to the position and orientation of the object, e.g., the three-dimensional position (x, y, z) and orientation (yaw, pitch, roll), relative to a reference frame. A VIO system typically uses computer vision algorithms to analyze camera images and estimate the movement and position of the XR device, while also using IMU data to improve the accuracy and reliability of the estimates. By combining visual and inertial data, VIO may provide more robust and accurate tracking than using either sensor modality alone. A VIO system is thus an example of a visual-inertial tracking system. In some examples, a VIO system may form part of a SLAM system, e.g., to perform the "Localization" function of the SLAM system.

The term "six degrees of freedom" (also referred to hereafter simply as a "6DOF") is used herein to refer to six degrees of freedom of movement. In the context of an XR device, 6DOF tracking refers to the tracking of the position and orientation of an object along three degrees of translational motion and three degrees of rotational motion.

The term "user session" is used herein to refer to an operation of an application during periods of time. For example, a session may refer to an operation of the AR application between the time the user puts on a head-wearable XR device and the time the user takes off the head-wearable device. In some examples, the user session starts when the XR device is turned on or is woken up from sleep mode and stops when the XR device is turned off or placed in sleep mode. In another example, the session starts when the user runs or starts the AR application, or runs or starts a particular feature of the AR application, and stops when the user ends the AR application or stops the particular features of the AR application.

As mentioned above, many XR devices include visual-inertial tracking systems. In some cases, a visual-inertial tracking system may perform relatively poorly when the user of the XR device is located in a moving vehicle, e.g., a car, a train, an airplane, or a bus. When located in a moving vehicle, vehicle dynamics may introduce noise or cause the XR device to obtain conflicting sensory information.

For example, the XR device may process data from a VIO system to apply an augmentation, e.g., to render a virtual apple on a surface in front of the user. Visual data (e.g., images captured by the XR device) may indicate that the XR device is substantially stationary relative to the external environment (e.g., the surface), while inertial data may be indicative of substantial motion with respect to the external environment, e.g., due to acceleration of the vehicle. In other words, a camera of the XR device may observe data relating to motion (or lack thereof) inside of the vehicle, while an IMU of the XR device senses motion with respect to the world outside of the vehicle. Such conflicting sensory information may lead to unsatisfactory tracking results and thus poor visual rendering, or even complete tracking loss. For example, virtual content may not be rendered in the correct position from the perspective of the user, or may shift from a desired position to an undesired position as a result of vehicle dynamics.

Examples of the present disclosure address technical problems associated with visual-inertial tracking in a moving object, such as in a moving vehicle, by providing an external sensor to resolve conflicting sensory information. For example, the external sensor may be an external IMU that tracks motion of the vehicle while an XR device is being used inside of the vehicle. The external IMU may communicate vehicle tracking data to the XR device to enable the XR device to account for vehicle dynamics when determining its real-time pose, and in order to render virtual content, thus providing a more robust XR experience inside of the moving vehicle.

According to some examples, a method is performed by an XR device that is located in and movable relative to a vehicle. The XR device may be a head-wearable apparatus worn by a user inside of the vehicle. The method includes generating, by the XR device, device tracking data, and accessing vehicle tracking data generated by an external sensor that is configured to measure motion of the vehicle. The XR device may then generate consolidated tracking data based on the device tracking data and the vehicle tracking data, and the consolidated tracking data may be used to determine a pose of the XR device. The pose of the XR device may be determined, or estimated, in relation to the vehicle. In other words, the vehicle may be used to define a frame of reference for the XR device pose.

In some cases, the XR device includes an image sensor (e.g., a camera) and an inertial sensor (e.g., an IMU), and the device tracking data thus includes both device image data (e.g., captured images or frames) and device inertial data (e.g., accelerometer, gyroscope or magnetometer measurements of the on-board IMU). The pose of the XR device may be its 6DOF pose determined relative to the vehicle. The method may further include using the pose of the XR device to render virtual content for presentation on a display of the XR device, e.g., an augmentation may be applied to a real-world object within the vehicle that is in the field of view of the XR device.

The external sensor may be positioned in, placed on, attached, connected, or mounted to the vehicle, or otherwise located so as to move substantially together with the vehicle, in use. For example, the external sensor may be located in a case of the XR device (e.g., a charging case) such that, in use, when the case is placed in the vehicle, the external sensor is able to track vehicle motion.

Vehicle tracking data may be streamed from the external sensor to the XR device. The XR device may utilize the vehicle tracking data, e.g., vehicle acceleration data, and/or the pose of the external sensor to determine the 6DOF pose of the XR device. The XR device may generate the consolidated tracking data by applying the data from the external sensor to the device tracking data. For example, in the case of an inconsistency between the device image data (e.g., images captured by the XR device) and the device inertial data (e.g., measurements of the on-board IMU of the XR device), the method may include applying the data received from the external sensor to resolve the inconsistency in order to determine the pose of the XR device more accurately.

One or more of the methodologies described herein facilitate solving the technical problem of providing high-quality tracking and/or robust content rendering (e.g., accurate virtual content placement) in the context of a moving vehicle. According to some examples, the presently described method provides an improvement to an operation of the functioning of a computer by utilizing external data to enhance real-time tracking capabilities.

When the effects in this disclosure are considered in aggregate, one or more of the methodologies described herein may obviate a need for certain efforts or resources that otherwise would be involved in visual-inertial tracking systems. Computing resources used by one or more machines, databases, or networks may be more efficiently utilized or even reduced, e.g., as a result of more accurate determinations of the pose of an object. Examples of such computing resources may include processor cycles, network traffic, memory usage, graphics processing unit (GPU) resources, data storage capacity, power consumption, and cooling capacity.

Other technical features may be readily apparent to one skilled in the art from the following figures, descriptions, and claims.

FIG. 1 is a network diagram illustrating a network environment 100 suitable for operating an XR device 110, according to some examples. The network environment 100 includes an XR device 110 and a server 112, communicatively coupled to each other via a network 104. The XR device 110 and the server 112 may each be implemented in a computer system, in whole or in part, as described below with respect to FIG. 12. The server 112 may be part of a network-based system. For example, the network-based system may be or include a cloud-based server system that provides additional information, such as virtual content (e.g., three-dimensional models of virtual objects, or augmentations to be applied as virtual overlays onto images depicting real-world scenes) to the XR device 110.

A user 106 operates the XR device 110. The user 106 may be a human user (e.g., a human being), a machine user (e.g., a computer configured by a software program to interact with the XR device 110), or any suitable combination thereof (e.g., a human assisted by a machine or a machine supervised by a human). The user 106 is not part of the network environment 100, but is associated with the XR device 110.

The XR device 110 may be a computing device with a display such as a smartphone, a tablet computer, or a wearable computing device (e.g., watch or glasses). The computing device may be hand-held or may be removably mounted to a head of the user 106. In some examples, the display may be a screen that displays what is captured with a camera of the XR device 110. In some examples, the display of the device may be transparent or semi-transparent such as in lenses of wearable computing glasses. In other examples, the display may be non-transparent and wearable by the user to cover the field of vision of the user.

The user 106 operates or interacts with an application of the XR device 110. The application may include an AR application configured to provide the user 106 with an experience triggered or enhanced by a physical object 108, such as a two-dimensional physical object (e.g., a picture), a three-dimensional physical object (e.g., a statue), a location (e.g., at factory), or any references (e.g., perceived corners of walls or furniture, or Quick Response (QR) codes) in the real-world physical environment. For example, the user 106 may point a camera of the XR device 110 to capture an image of the physical object 108 and a virtual overlay may be presented over the physical object 108 via the display.

The XR device 110 includes tracking components (not shown in FIG. 1). The tracking components track the pose (e.g., position, orientation, or location) of the XR device 110 relative to the real-world environment 102, or with respect to a reference frame, using image sensors (e.g., a depth-enabled three-dimensional camera, and an image camera), inertial sensors (e.g., gyroscope, accelerometer, magnetometer, or the like), wireless sensors (e.g., Bluetooth™ or Wi-Fi), Global Positioning System (GPS) sensor, and audio sensor to determine the location of the XR device 110 within the real-world environment 102.

In some examples, the server 112 may be used to detect and identify the physical object 108 based on sensor data (e.g., image and depth data) from the XR device 110, or determine a pose of the XR device 110 and/or the physical object 108 based on the sensor data. The server 112 can also generate a virtual object based on the pose of the XR device 110 and/or the physical object 108.

In some examples, the server 112 communicates the virtual object to the XR device 110. The XR device 110 or the server 112, or both, can also perform image processing, object detection and object tracking functions based on images captured by the XR device 110 and one or more parameters internal or external to the XR device 110. The object recognition, tracking, and AR rendering can be performed on either the XR device 110, the server 112, or a combination between the XR device 110 and the server 112. Accordingly, while certain functions are described herein as being performed by either an XR device or a server, the location of certain functionality may be a design choice. For example, it may be technically preferable to deploy particular technology and functionality within a server system initially, but later migrate this technology and functionality to a client installed locally at the XR device, e.g., where the XR device has sufficient processing capacity.

Any of the machines, databases, components or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 12. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 104 may be any network that enables communication between or among machines (e.g., server 112), databases, and devices (e.g., XR device 110). Accordingly, the network 104 may be a wired network, a wireless network (e.g., a mobile or cellular network), or any suitable combination thereof. The network 104 may include one or more portions that constitute a private network, a public network (e.g., the Internet), or any suitable combination thereof.

Figure 2:
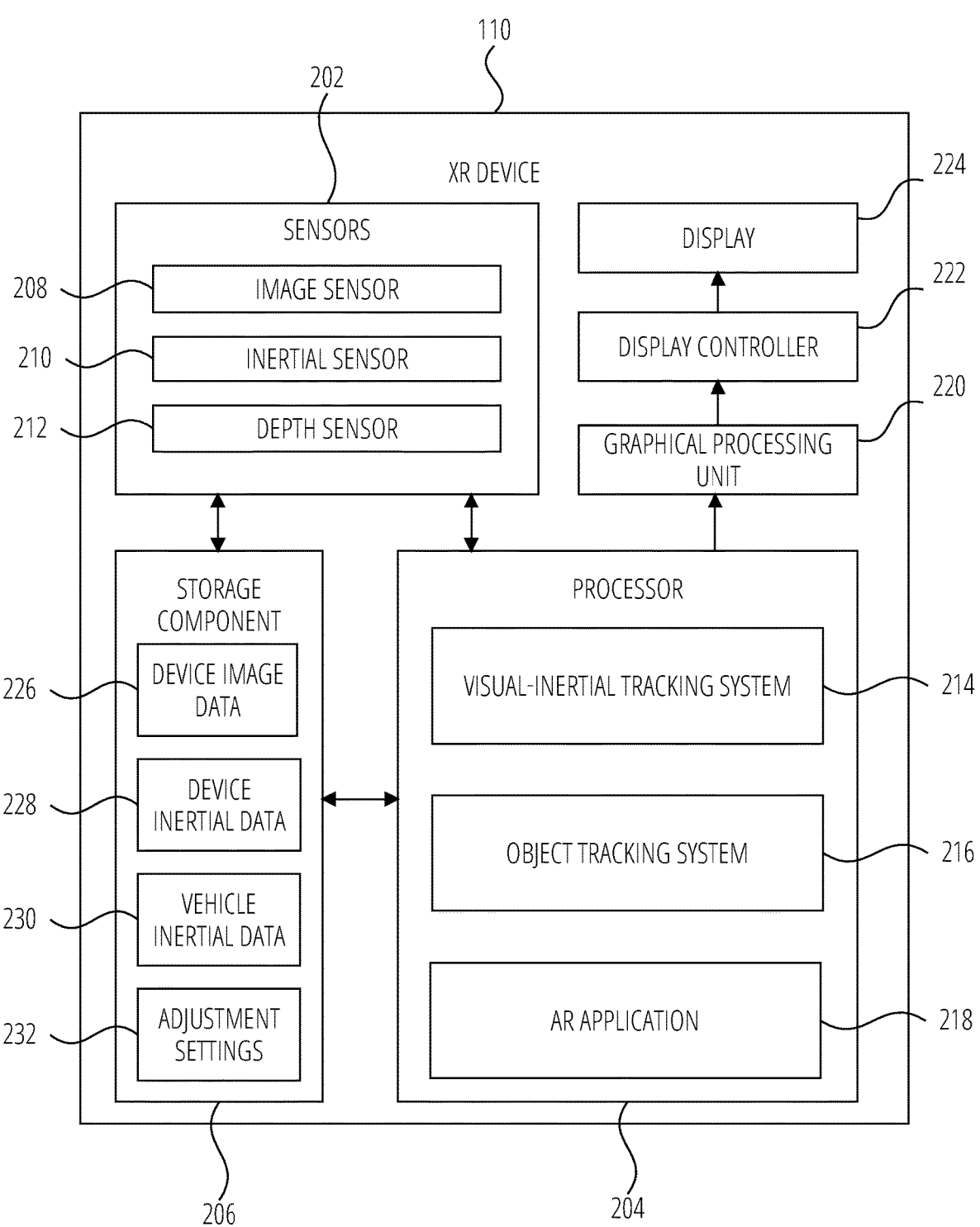
FIG. 2 is a block diagram illustrating components of an XR device, according to some examples.

FIG. 2 is a block diagram illustrating components of the XR device 110, according to some examples. The XR device 110 includes sensors 202, a processor 204, a storage component 206, a graphical processing unit 220, a display controller 222, and a display 224. Examples of the XR device 110 include a wearable computing device, a tablet computer, a navigational device, a portable media device, or a smart phone.

The XR device 110 detects and identifies a physical environment, or the physical object 108, using computer vision, and enables a user of the XR device 110 to experience virtual content, e.g., augmentations overlaid onto objects in the real world. Various sensors 202 are used by the XR device 110. The sensors 202 include an image sensor 208, an inertial sensor 210, and a depth sensor 212 (it will be appreciated, however, that multiple image sensors, multiple inertial sensors, or multiple depth sensors, may form part of the sensors 202).

The image sensor 208 may include one or a combination of a color camera, a thermal camera, a depth sensor, and one or multiple grayscale, global shutter tracking cameras. The inertial sensor 210 may be an IMU that includes a combination of a gyroscope, accelerometer, and a magnetometer. The depth sensor 212 may include one or a combination of a structured-light sensor, a time-of-flight sensor, passive stereo sensor, and an ultrasound device. Other examples of sensors 202 include a proximity or location sensor (e.g., near field communication, GPS, Bluetooth™, or Wi-Fi), an audio sensor (e.g., a microphone), or any suitable combination thereof. It is noted that the sensors 202 described herein are for illustration purposes and the sensors 202 are thus not limited to the ones described above.

The processor 204 implements a visual-inertial tracking system 214, an object tracking system 216, and an AR application 218. The visual-inertial tracking system 214 estimates a pose of the XR device 110 and continuously updates the estimated pose. For example, the visual-inertial tracking system 214 uses image data from the image sensor 208 and inertial data from the inertial sensor 210 to track a location and pose of the XR device 110 relative to a frame of reference (e.g., real-world environment 102 as shown in FIG. 1, or a vehicle 402 as will be described with reference to FIG. 4 below). The visual-inertial tracking system 214 may use images of the user's real-world environment 102, as well as other sensor data to identify a relative position and orientation of the XR device 110 from physical objects in the real-world environment 102 surrounding the XR device 110. In some examples, the visual-inertial tracking system 214 uses the sensor data to determine the 6DOF pose of the XR device 110. The visual-inertial tracking system 214 may utilize a VIO system in order to estimate the pose of an object in real-time.

In use, the visual-inertial tracking system 214 continually gathers and uses updated sensor data describing movements of the XR device 110, and other features (e.g., visual features), to determine updated three-dimensional poses of the XR device 110 that indicate changes in the relative position and orientation of the XR device 110 from the physical objects in the real-world environment 102. Examples of the present disclosure also provide for the visual-inertial tracking system 214 to receive external sensor data in order to generate more robust or accurate position or orientation calculations, as further described with reference to FIGS. 3-6 below. The visual-inertial tracking system 214 provides the three-dimensional pose of the XR device 110 to the graphical processing unit 220, which is then used as described below.

The XR device 110 can include, or be connected to, an object tracking system that tracks an object captured by one or more optical components (e.g., one or more cameras) of the XR device. In FIG. 2, the processor 204 is shown to implement an object tracking system 216. The object tracking system 216 builds a model of a real-world environment based on the tracked features.

In some examples, the object tracking system 216 receives a sequence of images and tracks the relevant object, e.g., the physical object 108, in a three-dimensional space, within each image. The object tracking system 216 may utilize various parameters to track an object. These parameters may include visual information (e.g., recognizing and tracking an object based on distinctive features), spatial information (e.g., using depth sensors and/or other spatial data to determine the object's location), motion information (e.g., using pose data and computer vision algorithms to track motion and position over time), and predictive information (e.g., using a machine learning model to predict object motion). Examples of the present disclosure also provide for the object tracking system 216 to receive external sensor data in order to generate more robust or accurate position or orientation calculations, as further described with reference to FIGS. 3-6 below.

The object tracking system 216 may implement one or more object tracking machine learning models to track an object in the field of view of a user during a user session. An object tracking machine learning model may comprise a neural network trained on suitable training data to identify and track objects in a sequence of frames captured by the XR device 110. The machine learning model may, in some examples, be known as a core tracker. A core tracker is used in computer visions systems to track the movement of an object in a sequence of images or videos. It typically uses appearance of an object, motion, landmarks (e.g., hand landmarks), and/or other features to estimate location in subsequent frames.

The object tracking system 216 may access a live stream from a current user session. For example, the object tracking system 216 retrieves images from the image sensor 208 and corresponding data from the visual-inertial tracking system 214, and processes the data to perform object tracking. In some examples, the object tracking system 216 builds a model of the real-world environment 102 based on tracked visual features, e.g., using a SLAM system.

The AR application 218 communicates with the visual-inertial tracking system 214 and/or object tracking system 216 to enable tracking of objects in the physical environment, e.g., hand tracking or body movement tracking, for purposes of providing an AR experience. The AR application 218 may retrieve a virtual object (e.g., three-dimensional object model) based on an identified physical object 108 or physical environment, or retrieve an augmentation to apply to the physical object 108. The AR application 218 may obtain or generate a visualization of a virtual object overlaid (e.g., superimposed upon, or otherwise displayed in tandem with) on an image of the physical object 108 captured by the image sensor 208. A visualization of the virtual object may be manipulated by adjusting a position of the physical object 108 (e.g., its physical location, orientation, or both) relative to the image sensor 208. Similarly, the visualization of the virtual object may be manipulated by adjusting a pose of the XR device 110 relative to the physical object 108.

As mentioned, the AR application 218 retrieves virtual content to be displayed to the user. The graphical processing unit 220 may include a render engine (not shown) that is configured to render a frame of a three-dimensional model of a virtual object based on the virtual content provided by the AR application 218 and the pose of the XR device 110

(e.g., relative to an object upon which virtual content is to be overlaid). In other words, the graphical processing unit 220 uses the pose of the XR device 110 to generate frames of virtual content to be presented on the display 224. For example, the graphical processing unit 220 uses the pose to render a frame of the virtual content such that the virtual content is presented at an orientation and position in the display 224 to properly augment the user's reality. As an example, the graphical processing unit 220 may use the pose data to render a frame of virtual content such that, when presented on the display 224, the virtual content overlaps with a physical object in the user's real-world environment 102. The graphical processing unit 220 can generate updated frames of virtual content based on updated poses of the XR device 110, which reflect changes in the position and orientation of the user in relation to physical objects in the user's real-world environment 102, thereby resulting in a better, e.g., more immersive or convincing, experience.

The graphical processing unit 220 transfers the rendered frame to the display controller 222. The display controller 222 is positioned as an intermediary between the graphical processing unit 220 and the display 224, receives the image data (e.g., rendered frame) from the graphical processing unit 220, re-projects the frame (e.g., by performing a warping process) based on a latest pose of the XR device 110 (and, in some cases, pose forecasts or predictions), and provides the re-projected frame to the display 224.

The display 224 includes a screen or monitor configured to display images generated by the processor 204. In some examples, the display 224 may be transparent or semi-transparent so that the user 106 can see through the display 224 (in AR use cases). In another example, the display 224, such as a LCOS (Liquid Crystal on Silicon) display, presents each frame of virtual content in multiple presentations. It will be appreciated that an XR device may include multiple displays, e.g., in the case of AR glasses, a left eye display and a right eye display. A left eye display may be associated with a left lateral side camera, with frames captured by the left lateral side camera being processed specifically for the left eye display. Likewise, the right eye display may be associated with a right lateral side camera, with frames captured by the right lateral side camera being processed specifically for the right eye display. It will be appreciated that, in examples where an XR device includes multiple displays, each display may have a dedicated graphical processing unit and/or display controller.

The storage component 206 may store various data, such as device image data 226, device inertial data 228, vehicle inertial data 230, and adjustment settings 232. The device image data 226 includes, for example, images (e.g., frames) captured by the image sensor 208. The device image data 226 may also include processed image data, e.g., image data to which computer vision algorithms have been applied to generate detections or predictions. The device inertial data 228 includes, for example, measurement data of the inertial sensor 210, such as accelerometer measurements, gyroscope measurements, magnetometer measurements, and/or temperature measurements. In some examples, the device image data 226 and the device inertial data 228 are referred to as "device tracking data," as the data originates from the on-board sensors of the XR device 110 (e.g., on-device sensors physically integrated into the XR device 110 so as to move when the XR device 110 moves).

The vehicle inertial data 230 includes, for example, data from an external sensor that is configured to measure motion of the vehicle. The external sensor may be an external IMU fitted to or placed in the vehicle that tracks vehicle acceleration, as described with reference to FIG. 4 below. The vehicle inertial data 230 may also include inertial data of the external sensor itself, e.g., magnetometer measurement data or other data to indicate a pose of the external sensor. In some examples, the vehicle inertial data 230 is referred to as "vehicle tracking data," or "external tracking data," as the data originates from an external sensor that is intended to capture movements of the vehicle or other useful external data.

The adjustment settings 232 may include settings, rules, algorithms, or the like used to generate consolidated tracking data based on the device tracking data and the vehicle tracking data. For example, and as described further below, the adjustment settings 232 may define algorithms executed by the processor 204 to supplement the on-board tracking data of the XR device 110 with external sensor data in order to generate the pose of the XR device 110, or to resolve inconsistencies between the device image data 226 and the device inertial data 228 by using the vehicle inertial data 230. As another example, the adjustment settings 232 may define features of a machine learning model that is executed by the processor 204 to perform such supplementation or pose determination, and/or to resolve such inconsistencies.

It will be appreciated that, where an XR device includes multiple displays, steps may be carried out separately and substantially in parallel for each display, in some examples. For example, an XR device may capture separate images for a left eye display and a right eye display, and separate outputs for each eye to create a more immersive experience and to adjust the focus and convergence of the overall view of a user for a more natural, three-dimensional view. Thus, while a single camera and a single output display may be discussed to describe some examples, similar techniques may be applied in devices including multiple cameras and multiple displays.

Figure 3:
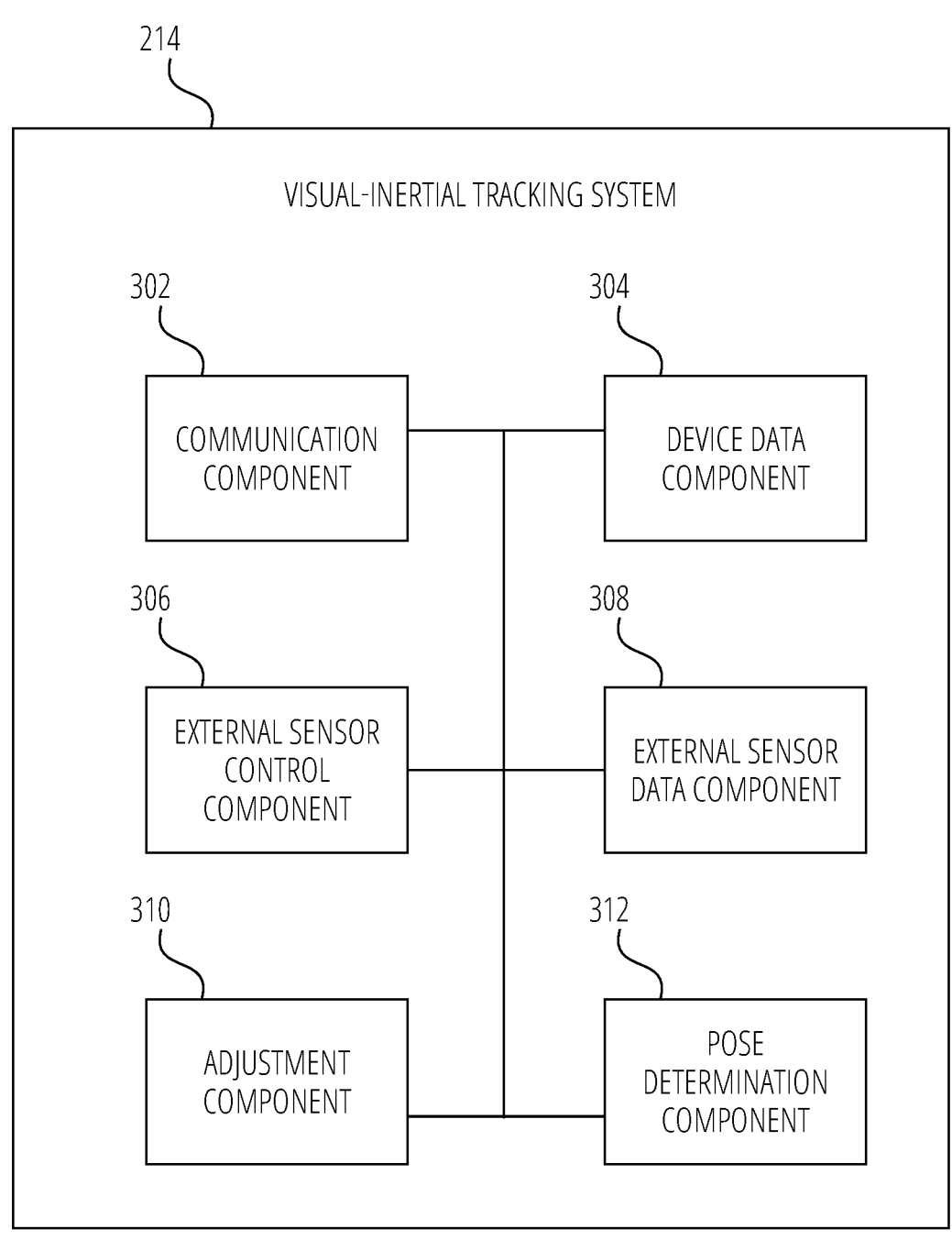
FIG. 3 is a block diagram illustrating components of a visual-inertial tracking system of an XR device, according to some examples.

FIG. 3 is a block diagram illustrating certain components of the visual-inertial tracking system 214, according to some examples. The visual-inertial tracking system 214 is shown to include a communication component 302, a device data component 304, an external sensor control component 306, an external sensor data component 308, an adjustment component 310, and a pose determination component 312.

The communication component 302 is responsible for enabling the visual-inertial tracking system 214 to access sensor data, e.g., input images captured by the image sensor 208, IMU data from the inertial sensor 210, and external sensor data, and to transmit output data to other components of the XR device 110. For example, the communication component 302 may cause pose data describing the pose of the XR device 110 to be transmitted to one or more of the object tracking system 216, the AR application 218, and the graphical processing unit 220 of the XR device 110. The communication component 302 may also communicate with the storage component 206 of the XR device 110 for data storage and retrieval.

The device data component 304 is responsible for generating or processing the device tracking data, e.g., based on sensor data stored as the device image data 226 and/or device inertial data 228. The external sensor control component 306 is responsible for transmitting control instructions to the external sensor (e.g., the external IMU 406 as described with reference to FIG. 4). For example, the external sensor control component 306 may instruct the external sensor to commence tracking by activating a tracking mode in which the external sensor generates the vehicle inertial data 230. The external sensor control component 306 may also instruct the external sensor to activate a non-tracking mode, e.g., in order to save power during periods where no external tracking data is required.

The external sensor data component 308 is responsible for processing data received from the external sensor, e.g., processing the vehicle inertial data 230 to obtain vehicle dynamics data or sensor pose data. The adjustment component 310 is configured to adjust sensor data to compensate, or account for, vehicle dynamics. For example, the adjustment component 310 may apply the vehicle inertial data 230 to the data from the on-board sensors to adjust the on-board sensor data (device tracking data) such that it accounts appropriately for vehicle motion. The adjustment component 310 may analyze differences between the device tracking data and the vehicle tracking data and make adjustments based on such differences. In some examples, the adjustment component 310 may be responsible for synchronizing the device tracking data with the vehicle tracking data received from the external sensor.

The pose determination component 312 is responsible for determining the pose of the XR device 110, e.g., based on the adjusted or consolidated tracking data as generated by the adjustment component 310. The pose determination component 312 may continuously update the pose of the XR device 110 based on the data from the on-board and external sensors, and the pose may be fed to the object tracking system 216, the AR application 218, and/or the graphical processing unit 220 for downstream use.

Any one or more of the components described herein, e.g., those shown in FIG. 2 or FIG. 3, may be implemented using hardware (e.g., a processor of a machine), software, or a combination of hardware and software. For example, any component described herein may configure a processor to perform the operations described herein for that component. Moreover, any two or more of these components may be combined into a single component, and the functions described herein for a single component may be subdivided among multiple components. Furthermore, according to various examples, components described herein as being implemented within a single machine, database, or device may be distributed across multiple machines, databases, or devices.

Figure 4:
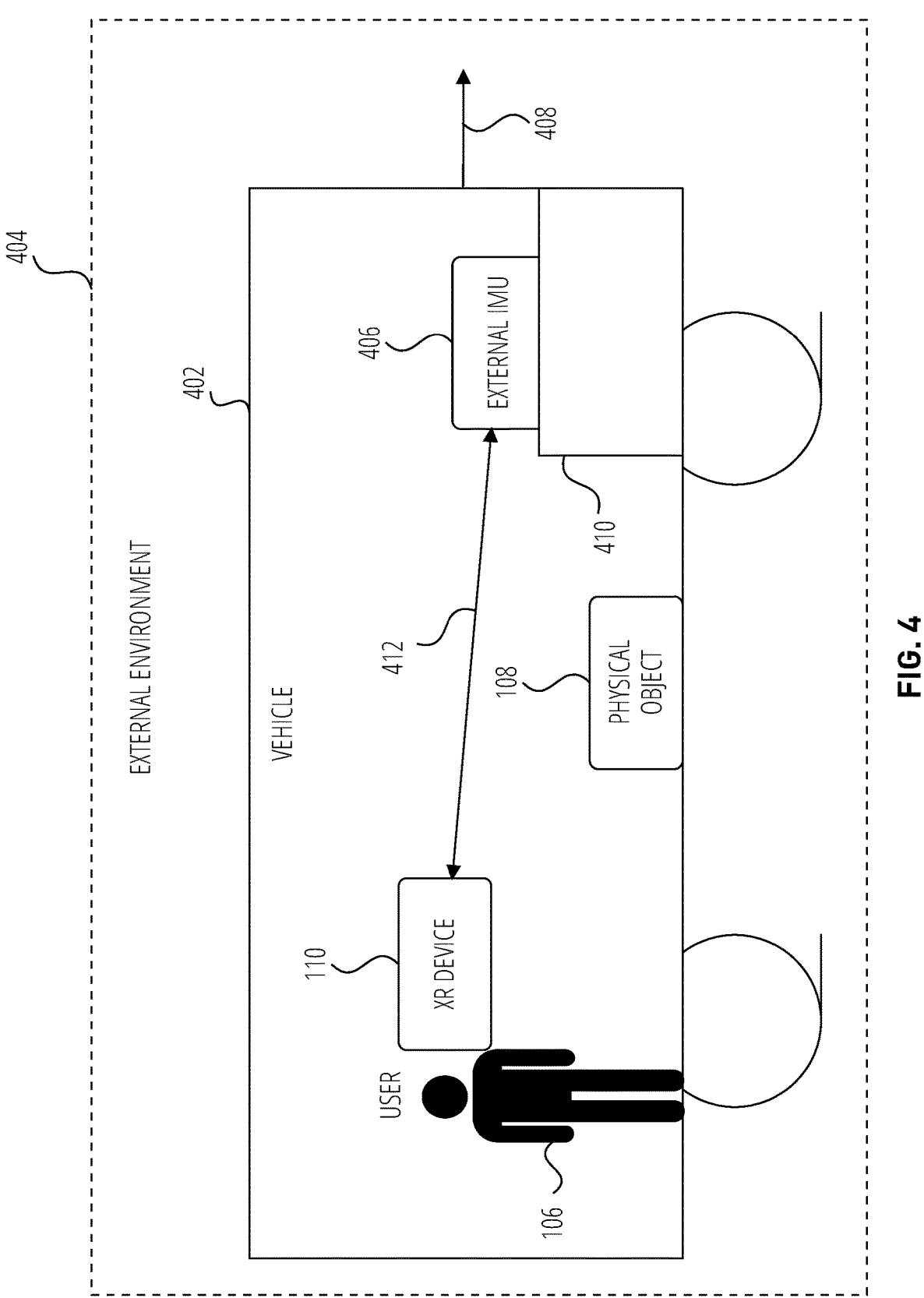
FIG. 4 is a diagrammatic illustration of an XR device that is operated inside of a moving vehicle, where the XR device is communicatively coupled to an external sensor located in the vehicle, according to some examples.

FIG. 4 illustrates the XR device 110 being operated inside of a moving vehicle 402 within an external environment 404, according to some examples. In FIG. 4, the XR device 110 is communicatively coupled to an external sensor in the example form of an external IMU 406 located in the vehicle 402. The vehicle 402 may, for example, be a train or a car. However, techniques disclosed herein may also be applied in the context of other vehicles.

In addition to the sensor data obtained from the on-board sensors of the XR device 110, it may be desirable to obtain external sensor data, e.g., vehicle tracking data or external tracking data, to resolve conflicting information generated as a result of vehicle dynamics, e.g., acceleration of the vehicle 402 as it moves in a direction of travel 408 and/or directional changes of the vehicle 402 along its path.

As mentioned above, the external IMU 406 may be positioned in, placed on, attached, connected, or mounted to the vehicle 402, or otherwise located so as to move substantially together with the vehicle 402, in use. In FIG. 4, the external IMU 406 is placed on a surface 410, e.g., a table or seat, within the vehicle 402 such that the external IMU 406 moves together with the vehicle 402. The external IMU 406 includes an adhesive component, such as a sticker, to ensure that it is relatively fixedly attached to the vehicle 402. The external IMU 406 may also include a battery (e.g., a rechargeable battery) or other component for powering the external IMU 406, as well as one or more other components, such as processing components, as described further below.

The external IMU 406 with its adhesive component is merely an example, and many different types or forms of external sensors may be utilized. For example, the external sensor may be a sensor located in an XR device case (e.g., a protective case or a charging case of the XR device 110), a sensor of a mobile device that is communicatively coupled to the XR device (e.g., a sensor of a phone or tablet of the user 106 connected to the XR device 110), a sensor attached to another type of adhesive component, a sensor attached to a magnetic coupling component, a sensor attached to a mechanical coupling component (e.g., a strap for strapping the sensor to the vehicle), or a sensor attached to another vehicle-mountable component.

In some examples, the external sensor may be provided by an on-board or built-in sensor of the vehicle, e.g., the vehicle 402 may have a built-in IMU and/or a SLAM system to which the XR device 110 wirelessly connects to obtain the vehicle tracking data. For example, vehicle tracking data may be obtained from an Advanced Driver Assistance System (ADAS) or other similar instrumentation in cases where the vehicle 402 is a car. Accordingly, the external sensor may be removably or non-removably attached to the vehicle 402.

It will be appreciated that the external sensor need not be directly attached to the vehicle 402 itself, e.g., the external sensor may be located in a case, in a bag, or the like, that is indirectly connected to the vehicle 402 in the sense that it moves substantially together with the vehicle 402.

In examples where the external sensor is removably attached to, or placed in, the vehicle 402, the XR device 110 and the external sensor may form part of an XR kit. For example, the user 106 may purchase or use an XR kit that includes the XR device 110 and a housing, or cover, that includes the external sensor, optionally together with other XR kit components (e.g., charging components, spare parts, other sensors, etc.). Where the housing or cover includes charging functionality, the addition of the external sensor to the housing or cover may provide dual functionality to that component of the XR kit.

The XR device 110 communicates with the external IMU 406 via any suitable communication protocol, e.g., a wireless communication protocol, such as Wi-Fi, Bluetooth, Local Area Network, Radio Frequency (RF), or Ultrawideband (UWB). In FIG. 4, the external IMU 406 thus includes a suitable communication component to enable the external IMU 406 to establish a wireless communication link 412 with the XR device 110.

As mentioned, the external sensor control component 306 of the XR device 110 may activate a tracking mode of the external IMU 406 by transmitting an appropriate control signal via the communication link 412. In some examples, the external IMU 406 only transmits measurements to the XR device 110 when in the tracking mode. The external IMU 406 may have multiple tracking modes, e.g., a high-power tracking mode in which tracking data is obtained and/or streamed to the XR device 110 at a high rate and a low-power tracking mode in which tracking data is obtained and/or streamed to the XR device 110 at a lower rate.

In use, according to some examples, the XR device 110 accesses the vehicle tracking data from the external IMU 406 by receiving a real-time stream of measurement data (e.g., accelerometer, gyroscope, and magnetometer data) from the external IMU 406 via the communication link 412. The external IMU 406 may transmit measurements directly to the XR device 110, e.g., in "raw" format, or may perform certain processing operations, e.g., preprocessing, prior to transmitting the vehicle tracking data to the XR device 110. Preprocessing operations may include, for example, one or more of data accumulation, data compression, data summarization, or addressing packet loss.

In some examples, the preprocessing operations performed by the external IMU 406 may include pre-integration. The term "pre-integration" refers to a technique used to improve the efficiency, robustness, or management of state estimation in the IMU context. An IMU commonly generates a large amount of high-frequency data, e.g., from its accelerometers and gyroscopes. This high-frequency data may cause difficulties, such as a strain on computing resources if each sample is to be processed individually. Pre-integration may involve integrating several IMU measurements over a period of time into a single measurement that represents a change in state (e.g., position, velocity, and orientation) over that period. Pre-integration may be performed in such a manner that it does not depend on the initial conditions at the start of the pre-integration period. This may be achieved by integrating measurements in a relative way, e.g., in the local coordinate frame of the IMU, and then formulating a correction that adjusts for the rotation of this frame during the pre-integration period when the pre-integrated measurement is actually used. In this way, IMU samples can be more efficiently processed by accumulating them between larger time steps.

The external IMU 406 may thus include one or more suitable processing components to perform processing operations, such as those mentioned above. Certain preprocessing operations may be performed by the external IMU 406, while others may be offloaded to the XR device 110 (or to a server-side component, where the XR device 110 is connected to a server 112).

As mentioned, the external IMU 406 may also transmit sensor pose data that is indicative of the pose of the external IMU 406, e.g., its pose relative to the vehicle 402 or its pose relative to some other frame of reference. For example, the external IMU 406 may transmit data to the XR device 110 to enable the XR device 110 to determine the gravitational alignment of the external IMU 406 and/or the manner in which it is aligned with the vehicle 402 or its direction of travel 408.

The types of external sensors that may be utilized are not limited to IMUs. In some examples, one or more other types of external sensors may be utilized instead of, or in addition to, an IMU. To this end, the XR device 110 may thus be connected to one or multiple secondary external sensors. A secondary external sensor 602, according to some examples, is shown in FIG. 6, and referenced again below.

Secondary external sensors may include one or more of: a location tracking device, an UWB component, a camera, a temperature measurement device, a microphone, or an ultrasound arrangement. External data transmitted to the XR device 110 may thus include data provided by the secondary external sensor 602, such as, for example, positional data (e.g., GPS or Global Navigation Satellite System (GNSS)), temperature data, or pressure data.

Figure 5:
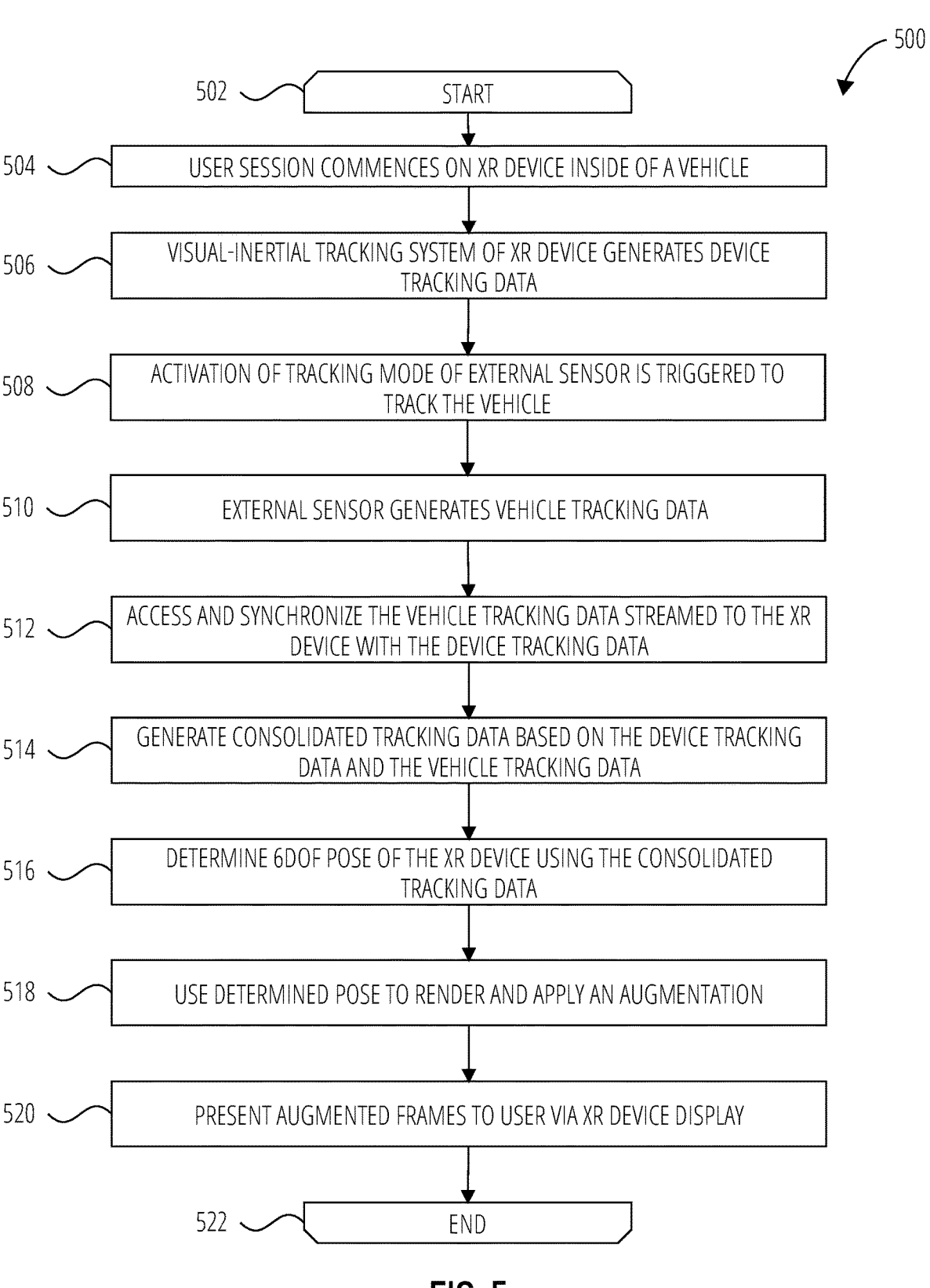
FIG. 5 is a flowchart illustrating a visual-inertial tracking method performed by an XR device utilizing data from an external sensor, according to some examples.

FIG. 5 is a flow diagram illustrating a visual-inertial tracking method 500 performed by an XR device utilizing data from an external sensor, according to some examples. Operations in the method 500 may be performed by the XR device 110 and the external IMU 406. Accordingly, the method 500 is described by way of example with reference to devices and components of FIGS. 1-4. Reference is also made to the interaction diagram 600 of FIG. 6, which illustrates some of the interactions between components of an XR device 110 and the external IMU 406 in the context of a visual-inertial tracking process, according to some examples.

It shall be appreciated that at least some of the operations of the method 500, and operations related to the interactions shown in the interaction diagram 600, may be deployed on various other hardware configurations or be performed by similar components residing elsewhere. The term "operation" is used to refer to elements in the drawings for ease of reference and it will be appreciated that each "operation" may identify one or more operations, processes, actions, or steps.

At a high level, the method 500 includes receiving, by the XR device 110, external tracking data from the external IMU 406 (that is attached or connected to the vehicle 402), generating consolidated tracking data based on the external sensor data and device tracking data, and determining a 6DOF pose and/or 6DOF motion of the XR device 110 relative to the vehicle 402 based on the consolidated tracking data.

Turning now specifically to the operations shown in FIG. 5, the method 500 commences at opening loop element 502 and proceeds to operation 504, where a user session commences on the XR device 110 while the XR device 110 is inside of the moving vehicle 402, e.g., as shown in FIG. 4. The user 106 may, for example, wish to experience AR while in the vehicle 402, e.g., view augmentations applied to objects within the vehicle 402, navigate an AR user interface, or play an interactive AR game.

Figure 6:
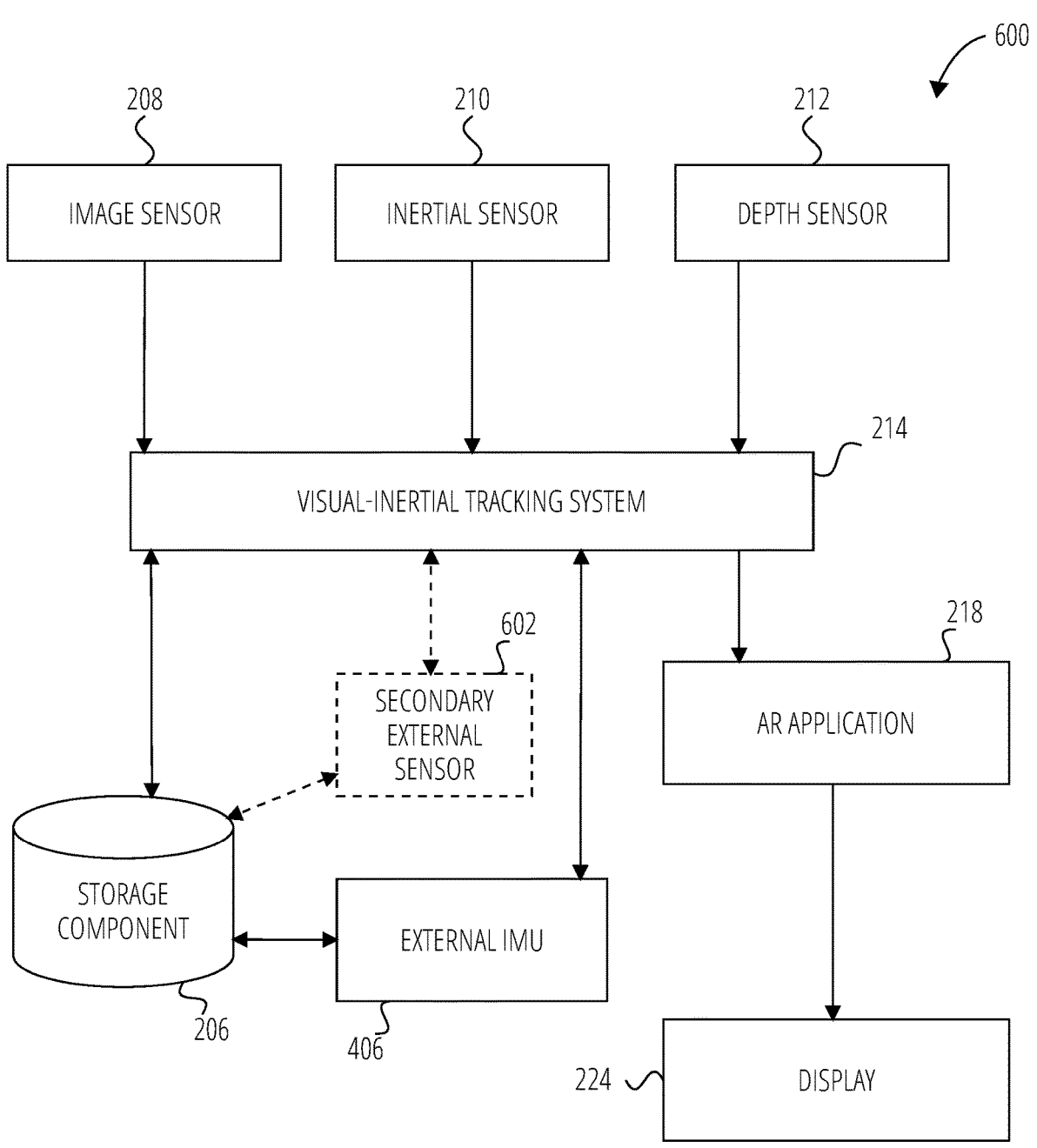
FIG. 6 is a block diagram illustrating interaction between certain components of an XR device and an external sensor in the context of a visual-inertial tracking process, according to some examples.

The visual-inertial tracking system 214 generates device tracking data (operation 506) using the information from the image sensor 208 and the inertial sensor 210 (and optionally other sensors, e.g., the depth sensor 212, as shown in FIG. 6). As explained above, when located in the vehicle 402, vehicle dynamics may introduce noise or cause the XR device 110 to obtain conflicting sensory information when relying only on the on-board sensors of the XR device 110. For example, the device image data originating from the image sensor 208, which captures images of the interior of the vehicle 402, may be in conflict with or contradict the device inertial data from the inertial sensor 210 of the XR device 110 as a result of motion, e.g., acceleration, picked up by the inertial sensor 210. In other words, the interior of the vehicle 402 does not appear to be moving based on image sensor 208 data, while the inertial sensor 210 detects the movement of the vehicle 402. To mitigate or alleviate this issue, external tracking data relating to motion of the vehicle 402 is obtained from the external IMU 406, e.g., to enable the XR device 110 to estimate its pose relative to the vehicle 402 more robustly or accurately, as described further below.

At operation 508, a tracking mode of the external IMU 406 is activated. In some examples, activation of the tracking mode of the external IMU 406 is triggered by one or more predefined events. The external IMU 406 may be switched on, or transitioned to the tracking mode, by the external IMU 406 itself (without an explicit instruction from the XR device 110) or in response to an instruction from the XR device 110.

For example, the external IMU 406 may detect a predefined motion of the vehicle, e.g., simple motion or acceleration, and in response thereto, the external IMU 406 may transition from a non-tracking mode (e.g., an idle mode) to the tracking mode. The external IMU 406 may include a suitable motion detection component for this purpose. As another example, the XR device 110 may transmit a control instruction to activate the tracking mode upon detecting that a certain AR experience is to be provided by the AR application 218.

The external IMU 406 may be configured to transmit a notification to the XR device 110 upon detecting predefined motion of the XR device 110. For example, the external IMU 406 may alert the XR device 110 to the fact that movement of the vehicle 402 has been detected. In turn, the XR device 110 may then analyze its device tracking data to determine whether the data is to be supplemented with external data from the external IMU 406 in order to improve pose estimates.

In some examples, the XR device 110 may detect an inconsistency between the device image data and the device inertial data, e.g., the conflicting data referred to above. In response to detecting the inconsistency, the XR device 110 may transmit a control instruction to activate the tracking mode of the external IMU 406 such that the data from the external IMU 406, e.g., the vehicle tracking data, can be automatically applied to resolve the inconsistency between the device image data and the device inertial data. If the tracking mode is already active upon detecting such an inconsistency, the XR device 110 may start processing the incoming data from the external IMU 406.

The visual-inertial tracking system 214 may implement a predefined algorithm, or set of algorithms, to check for such an inconsistency, or may implement a machine learning model that outputs an indication of the degree of inconsistency. The algorithm/s or machine learning model may, in some examples, compare signals from the image sensor 208 and the inertial sensor 210 and analyze discrepancies between the signals, or discrepancies in tracking predictions arising as a result of the signals. In some cases, the XR device 110 only utilizes the external data (e.g., activates the tracking mode and starts processing the external data) if the number of discrepancies, or degree of inconsistency, between the signals is above a predefined threshold.

Signals from the image sensor 208 and the inertial sensor 210 may be compared in numerous ways. One example technique involves automatically comparing, by the XR device 110, expected visual changes with actual visual data obtained from the image sensor 208. Based on previous frames captured by the image sensor 208 and device inertial data from the inertial sensor 210, the XR device 110 may generate a prediction as to expected visual changes or a prediction as to the location of objects in subsequent image frames. For example, based on motion detected by the inertial sensor 210, the XR device 110 may expect that an object in the field of view of the user 106 will move from left to right by a certain distance. However, if the reading of the inertial sensor 210 was caused or affected by vehicle dynamics, and the left to right movement does not occur, e.g., the image sensor 208 does not subsequently capture frames depicting corresponding movement, or if the movement captured by the image sensor 208 differs significantly from what is expected, the XR device 110 may classify the conflict as an inconsistency or discrepancy. In some examples, if the XR device 110 detects multiple discrepancies or a discrepancy that exceeds a threshold, this may trigger the XR device 110 to start sampling the vehicle tracking data from the external IMU 406.

While the examples described with respect to FIG. 5 include triggering activation of the tracking mode of the external IMU 406, it will be appreciated that, in other examples, the external IMU 406 may have an "always on" or "always tracking" configuration in which it continuously streams external tracking data to the XR device 110, provided there is a communication link 412 between them. In such cases, the XR device 110 may be configured only to apply or process the external tracking data received from the external IMU 406 when the external tracking data is determined to be required to accurately estimate the pose of the XR device 110, e.g., when there is an inconsistency within the on-board tracking data of the XR device 110.

Once the external IMU 406 is in the tracking mode, it generates vehicle tracking data at operation 510. The XR device 110 accesses the vehicle tracking data streamed to the XR device 110 and synchronizes the vehicle tracking data with the on-board device tracking data at operation 512. As mentioned, the vehicle tracking data may include a pose of the external IMU 406, or IMU data that the XR device 110 can process to determine the pose of the external IMU 406. In some examples, e.g., where the external IMU 406 is removably attached to the vehicle 402, the XR device 110 may determine the pose of the external IMU 406 prior to further processing of the vehicle tracking data, e.g., prior to applying the vehicle tracking data to the device tracking data to resolve inconsistencies. The pose of the external IMU 406 may, for example, be used downstream by the XR device 110 to determine or assess the direction of travel 408 of the vehicle 402, or determine a relative pose of the XR device 110 compared to the external IMU 406.

The method 500 then proceeds to operation 514, where the XR device 110 generates consolidated tracking data based on the device tracking data and the vehicle tracking data. The consolidated tracking data may be generated in a number of ways. For example, the XR device 110 may automatically analyze differences between the device tracking data and the vehicle tracking data and generate the consolidated tracking data based on the differences. In some cases, the XR device 110 may specifically analyze the differences between the IMU data of the external IMU 406 and the IMU data of the inertial sensor 210 to determine the motion, as detected by the inertial sensor 210, that is attributable to the vehicle 402 moving in the external environment 404 and not to movement of objects inside of the vehicle 402. Thus, in some cases, the consolidated tracking data may be data that substantially "disregards" the motion of the vehicle 402 to enable the XR device 110 to focus only on motion that is occurring inside of, and relative to, the vehicle 402.

In some cases, the XR device 110 may measure differences between the IMU data of the external IMU 406 and the IMU data of the inertial sensor 210 so that a relative pose between the XR device 110 and the vehicle 402 can be generated and/or used downstream (see operation 516). The consolidated tracking data may thus reflect the differences in IMU data. To determine differences between, or enable comparison of, IMU data of the external IMU 406 and the IMU data of the inertial sensor 210, the data may be adjusted (e.g., through rotation or transformation) such that the data is expressed along, or with reference to, the same coordinate system.

In some examples, the consolidated tracking data simply refers to a combined set of the device tracking data and vehicle tracking data. In other examples, the consolidated tracking data refers to the resultant data set after the vehicle tracking data has been applied to supplement or adjust the device tracking data, e.g., IMU measurements in the vehicle tracking data may be subtracted from IMU measurements in the device tracking data (e.g., after suitable transformation, rotation, or alignment) to yield the consolidated tracking data, or a relative pose may be generated and added to the data to yield the consolidated tracking data.

The XR device 110 then determines the 6DOF pose of the XR device 110 using the consolidated tracking data (as opposed to only using the device tracking data) at operation 516. The consolidated tracking data may enable the XR device 110 to estimate the position, orientation, and/or movement of the XR device 110 more accurately and robustly, given that it accounts for vehicle dynamics. More specifically, in some examples, the visual-inertial tracking system 214 determines the pose (e.g., location, position, orientation, and/or inclination) of the XR device 110 relative to the vehicle 402 by using the on-board sensor data as well as data from the external IMU 406, and optionally also a secondary external sensor 602, as shown in FIG. 6. In some examples, the visual-inertial tracking system 214 estimates the pose of the XR device 110 based on three-dimensional maps of feature points from images captured with the image sensor 208, the inertial sensor data captured with the inertial sensor 210, and based on adjustments to the data using the vehicle tracking data from the external IMU 406 that is incorporated into the consolidated tracking data.

In this way, the XR device 110 may substantially compensate for vehicle dynamics or vehicle motion related noise, and the XR device 110 is able to accurately estimate its 6DOF pose or 6DOF motion relative to the vehicle 402. An estimate of the relative pose between the XR device 110 and the vehicle 402 may be adjusted and updated iteratively. For example, the data from the image sensor 208 may be used to adjust or improve the estimated pose as a user session progresses.

The visual-inertial tracking system 214 may execute a machine learning model that is trained to estimate the pose of the XR device 110 relative to the vehicle 402 based on at least three data sets: the device image data, the device inertial data, and the vehicle inertial data. The machine learning model may, for example, be trained to analyze differences between the device tracking data and the vehicle tracking data and to estimate the pose based on the differences. Alternatively, the visual-inertial tracking system 214 may execute an optimization process in which the goal is to estimate a hidden state variable that yields the required pose data. The process may involve utilizing a mathematical model that describes the relationship between the pose of the XR device 110, and the various types of tracking data or sensor measurements respectively, and executing an optimizer, e.g., a nonlinear optimizer, to obtain the pose data, such as the relative pose referred to above.

At operation 518, the XR device 110 uses the determined pose to render and apply an augmentation. Rendering and application of an augmentation has been described above, according to some examples, with reference to FIG. 2. In some examples, the augmentation is applied to an object viewed by the user 106 in the vehicle 402 and must thus be accurately rendered for presentation on the display 224.

While in the moving vehicle, the XR device 110 may access one or more images captured by the image sensor 208 and depicting a scene including the object. The XR device 110 may then locate the object relative to a field of view of the user by using the determined pose of the XR device 110 in relation to the vehicle 402. Based on the locating of the object, the relevant augmentation (e.g., as obtained by the AR application 218) can then be rendered with respect to the object, e.g., such that it appears overlaid on the object. The augmented frames (e.g., frames that display the virtual content generated by the XR device 110) are then presented to the user 106 via the display 224 at operation 520, and as illustrated in a simplified manner in FIG. 6. The method 500 concludes at closing loop element 522.

Figure 7:
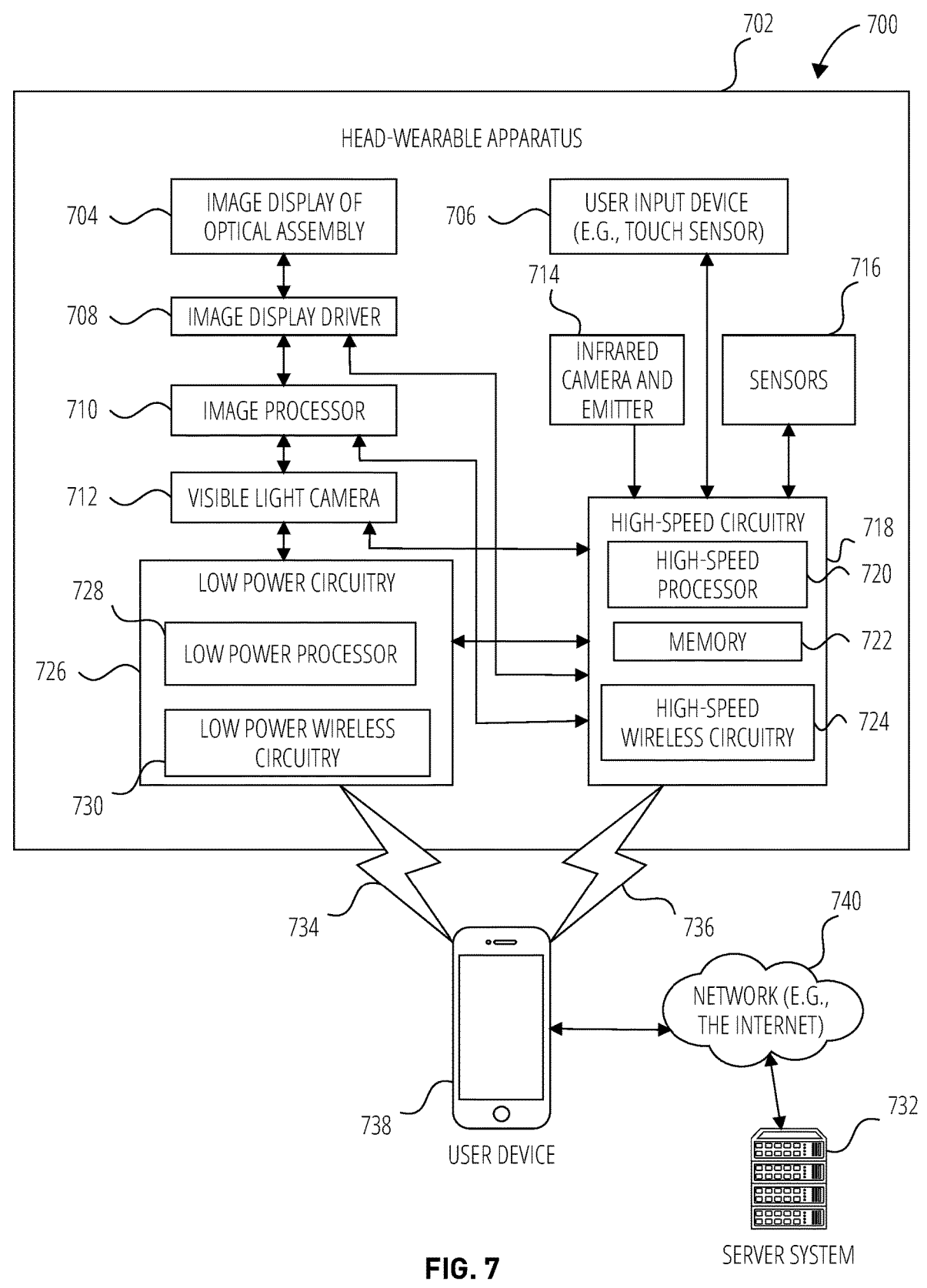
FIG. 7 illustrates a network environment in which a head-wearable apparatus can be implemented, according to some examples.

FIG. 7 illustrates a network environment 700 in which a head-wearable apparatus 702 can be implemented according to some examples. The XR device 110 as described above may include one or more features of the head-wearable apparatus 702. FIG. 7 provides a high-level functional block diagram of an example head-wearable apparatus 702 communicatively coupled a mobile user device 738 and a server system 732 via a suitable network 740. Adaptive image processing techniques described herein may be performed using the head-wearable apparatus 702 or a network of devices similar to those shown in FIG. 7.

The head-wearable apparatus 702 includes a camera, such as at least one of a visible light camera 712, an infrared camera and emitter 714 and sensors 716. The user device 738 can be capable of connecting with head-wearable apparatus 702 using both a communication link 734 and a communication link 736. The user device 738 is connected to the server system 732 via the network 740. The network 740 may include any combination of wired and wireless connections.

The head-wearable apparatus 702 includes two displays of image display of optical assembly 704. The two displays include one associated with the left lateral side and one associated with the right lateral side of the head-wearable apparatus 702. The head-wearable apparatus 702 also includes an image display driver 708, an image processor 710, low power circuitry 726, and high-speed circuitry 718. The two displays of the image display of optical assembly 704 are for presenting images and videos, including an image that can provide a graphical user interface to a user of the head-wearable apparatus 702.

The image display driver 708 commands and controls the image display of the image display of optical assembly 704. The image display driver 708 may deliver image data directly to each image display of the image display of optical assembly 704 for presentation or may have to convert the image data into a signal or data format suitable for delivery to each image display device. For example, the image data may be video data formatted according to compression formats, such as H. 264 (MPEG-4 Part 10), HEVC, Theora, Dirac, Real Video RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

Figure 8:
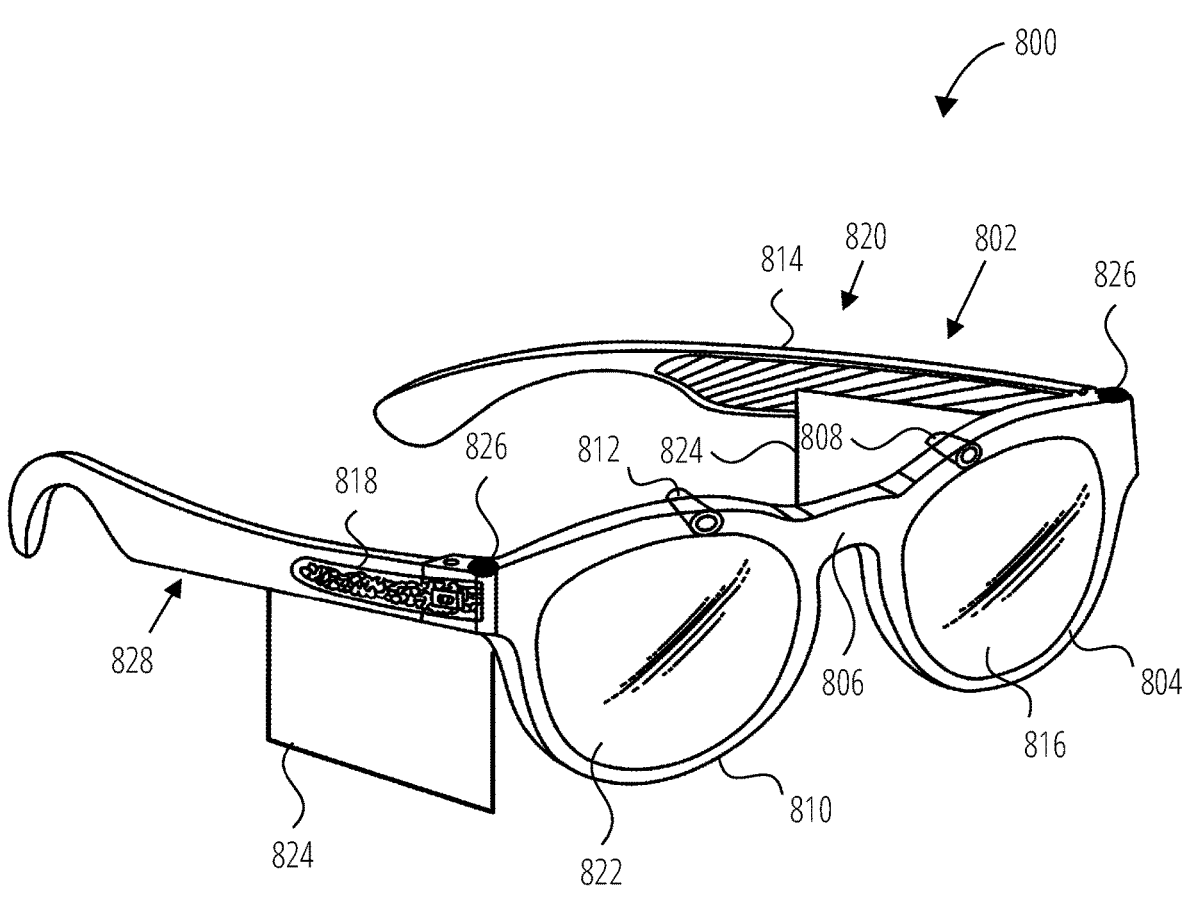
FIG. 8 is a perspective view of a head-wearable apparatus, according to some examples.
Figure 9:
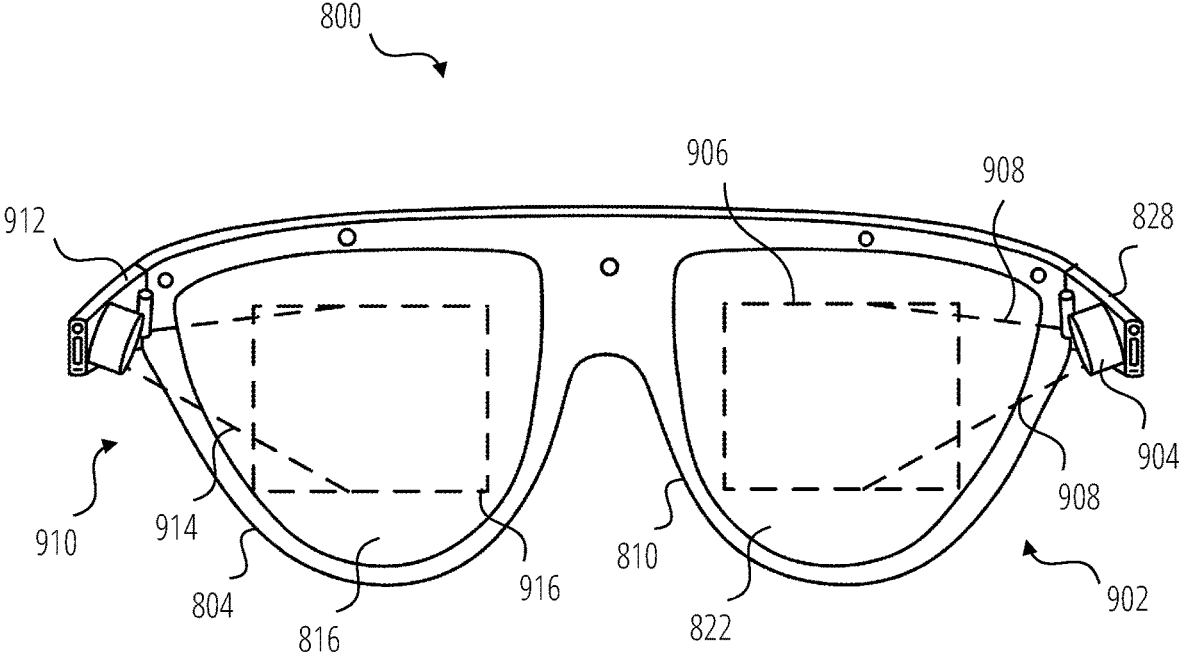
FIG. 9 illustrates a further view of the head-wearable apparatus of FIG. 8, showing the head-wearable apparatus from the perspective of a user, according to some examples.

The head-wearable apparatus 702 may include a frame and stems (or temples) extending from a lateral side of the frame (see FIG. 8 and FIG. 9 which show an apparatus according to some examples). The head-wearable apparatus 702 of FIG. 7 further includes a user input device 706 (e.g., touch sensor or push button) including an input surface on the head-wearable apparatus 702. The user input device 706 is configured to receive, from the user, an input selection to manipulate the graphical user interface of the presented image.

The components shown in FIG. 7 for the head-wearable apparatus 702 are located on one or more circuit boards, for example a printed circuit board (PCB) or flexible PCB, in the rims or temples. Alternatively, or additionally, the depicted components can be located in the chunks, frames, hinges, or bridge of the head-wearable apparatus 702. Left and right sides of the head-wearable apparatus 702 can each include a digital camera element such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 702 includes a memory 722 which stores instructions to perform a subset or all of the functions described herein. The memory 722 can also include a storage device. As further shown in FIG. 7, the high-speed circuitry 718 includes a high-speed processor 720, the memory 722, and high-speed wireless circuitry 724. In FIG. 7, the image display driver 708 is coupled to the high-speed circuitry 718 and operated by the high-speed processor 720 in order to drive the left and right image displays of the image display of optical assembly 704. The high-speed processor 720 may be any processor capable of managing high-speed communications and operation of any general computing system needed for the head-wearable apparatus 702. The high-speed processor 720 includes processing resources needed for managing high-speed data transfers over the communication link 736 to a wireless local area network (WLAN) using high-speed wireless circuitry 724. In certain examples, the high-speed processor 720 executes an operating system such as a LINUX operating system or other such operating system of the head-wearable apparatus 702 and the operating system is stored in memory 722 for execution. In addition to any other responsibilities, the high-speed processor 720 executing a software architecture for the head-wearable apparatus 702 is used to manage data transfers with high-speed wireless circuitry 724. In certain examples, high-speed wireless circuitry 724 is configured to implement Institute of Electrical and Electronic Engineers (IEEE) 702.11 communication standards, also referred to herein as Wi-Fi. In other examples, other high-speed communications standards may be implemented by high-speed wireless circuitry 724.

The low power wireless circuitry 730 and the high-speed wireless circuitry 724 of the head-wearable apparatus 702 can include short range transceivers (Bluetooth™) and wireless wide, local, or wide area network transceivers (e.g., cellular or Wi-Fi). The user device 738, including the transceivers communicating via the communication link 734 and communication link 736, may be implemented using details of the architecture of the head-wearable apparatus 702, as can other elements of the network 740.

The memory 722 includes any storage device capable of storing various data and applications, including, among other things, camera data generated by the visible light camera 712, sensors 716, and the image processor 710, as well as images generated for display by the image display driver 708 on the image displays of the image display of optical assembly 704. While the memory 722 is shown as integrated with the high-speed circuitry 718, in other examples, the memory 722 may be an independent standalone element of the head-wearable apparatus 702. In certain such examples, electrical routing lines may provide a connection through a chip that includes the high-speed processor 720 from the image processor 710 or low power processor 728 to the memory 722. In other examples, the high-speed processor 720 may manage addressing of memory 722 such that the low power processor 728 will boot the high-speed processor 720 any time that a read or write operation involving memory 722 is needed.

As shown in FIG. 7, the low power processor 728 or high-speed processor 720 of the head-wearable apparatus 702 can be coupled to the camera (visible light camera 712, or infrared camera and emitter 714), the image display driver 708, the user input device 706 (e.g., touch sensor or push button), and the memory 722. The head-wearable apparatus

702 also includes sensors 716, which may be the motion components 1234, position components 1238, environmental components 1236, and biometric components 1232, e.g., as described below with reference to FIG. 12. In particular, motion components 1234 and position components 1238 are used by the head-wearable apparatus 702 to determine and keep track of the position and orientation (the "pose") of the head-wearable apparatus 702 relative to a frame of reference or another object, in conjunction with a video feed from one of the visible light cameras 712, using for example techniques such as structure from motion (SfM) or visual-inertial odometry (VIO).

In some examples, and as shown in FIG. 7, the head-wearable apparatus 702 is connected with a host computer. For example, the head-wearable apparatus 702 is paired with the user device 738 via the communication link 736 or connected to the server system 732 via the network 740. The server system 732 may be one or more computing devices as part of a service or network computing system, for example, that include a processor, a memory, and network communication interface to communicate over the network 740 with the user device 738 and head-wearable apparatus 702.

The user device 738 includes a processor and a network communication interface coupled to the processor. The network communication interface allows for communication over the network 740, communication link 734 or communication link 736. The user device 738 can further store at least portions of the instructions for generating a binaural audio content in the user device 738's memory to implement the functionality described herein.

Output components of the head-wearable apparatus 702 include visual components, such as a display (e.g., a liquid crystal display (LCD)), a plasma display panel (PDP), a light emitting diode (LED) display, a projector, or a waveguide. The image displays of the optical assembly are driven by the image display driver 708. The output components of the head-wearable apparatus 702 further include acoustic components (e.g., speakers), haptic components (e.g., a vibratory motor), other signal generators, and so forth. The input components of the head-wearable apparatus 702, the user device 738, and server system 732, such as the user input device 706, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 702 may optionally include additional peripheral device elements. Such peripheral device elements may include biometric sensors, additional sensors, or display elements integrated with the head-wearable apparatus 702. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over a communication link 736 from the user device 738 via the low power wireless circuitry 730 or high-speed wireless circuitry 724.

FIG. 8 is a perspective view of a head-wearable apparatus in the form of glasses 800, in accordance with some examples. The XR device 110 as described above may include one or more features of the glasses 800. The glasses 800 can include a frame 802 made from any suitable material such as plastic or metal, including any suitable shape memory alloy. In one or more examples, the frame 802 includes a first or left optical element holder 804 (e.g., a display or lens holder) and a second or right optical element holder 810 connected by a bridge 806. A first or left optical element 816 and a second or right optical element 822 can be provided within respective left optical element holder 804 and right optical element holder 810. The right optical element 822 and the left optical element 816 can be a lens, a display, a display assembly, or a combination of the foregoing. Any suitable display assembly can be provided in the glasses 800.

The frame 802 additionally includes a left arm or temple piece 820 and a right arm or temple piece 828. In some examples, the frame 802 can be formed from a single piece of material so as to have a unitary or integral construction.

The glasses 800 can include a computing device, such as a computer 818, which can be of any suitable type so as to be carried by the frame 802 and, in some examples, of a suitable size and shape, so as to be partially disposed in one of the temple piece 820 or the temple piece 828. The computer 818 can include one or more processors with memory, wireless communication circuitry, and a power source. As discussed with reference to FIG. 7 above, the computer 818 may comprise low-power circuitry, high-speed circuitry, and a display processor. Various other examples may include these elements in different configurations or integrated together in different ways. Additional details of aspects of the computer 818 may be implemented as illustrated by the head-wearable apparatus 702 discussed above.

The computer 818 additionally includes a battery 814 or other suitable portable power supply. In some examples, the battery 814 is disposed in left temple piece 820 and is electrically coupled to the computer 818 disposed in the right temple piece 828. The glasses 800 can include a connector or port (not shown) suitable for charging the battery 814 a wireless receiver, transmitter or transceiver (not shown), or a combination of such devices.

The glasses 800 include a first or left camera 808 and a second or right camera 812. Although two cameras are depicted, other examples contemplate the use of a single or additional (i.e., more than two) cameras. In some examples, the glasses 800 include any number of input sensors or other input/output devices in addition to the left camera 808 and the right camera 812. Such sensors or input/output devices can additionally include biometric sensors, location sensors, motion sensors, and so forth. In some examples, the left camera 808 and the right camera 812 provide video frame data for use by the glasses 800 to extract three-dimensional information from a real-world scene, to track objects, to determine relative positions between objects, etc.

The glasses 800 may also include a touchpad 824 mounted to or integrated with one or both of the left temple piece 820 and right temple piece 828. The touchpad 824 is generally vertically-arranged, approximately parallel to a user's temple in some examples. As used herein, generally vertically aligned means that the touchpad is more vertical than horizontal, although potentially more vertical than that. Additional user input may be provided by one or more buttons 826, which in the illustrated examples are provided on the outer upper edges of the left optical element holder 804 and right optical element holder 810. The one or more touchpads 824 and buttons 826 provide a means whereby the glasses 800 can receive input from a user of the glasses 800.

FIG. 9 illustrates the glasses 800 from the perspective of a user. For clarity, a number of the elements shown in FIG. 8 have been omitted. As described in FIG. 8, the glasses 800 shown in FIG. 9 include left optical element 816 and right optical element 822 secured within the left optical element holder 804 and the right optical element holder 810, respectively.

The glasses 800 include forward optical assembly 902 comprising a right projector 904 and a right near eye display 906, and a forward optical assembly 910 including a left projector 912 and a left near eye display 916.

In some examples, the near eye displays are waveguides. The waveguides include reflective or diffractive structures (e.g., gratings and/or optical elements such as mirrors, lenses, or prisms). Light 908 emitted by the projector 904 encounters the diffractive structures of the waveguide of the near eye display 906, which directs the light towards the right eye of a user to provide an image on or in the right optical element 822 that overlays the view of the real world seen by the user. Similarly, light 914 emitted by the projector 912 encounters the diffractive structures of the waveguide of the near eye display 916, which directs the light towards the left eye of a user to provide an image on or in the left optical element 816 that overlays the view of the real world seen by the user. The combination of a GPU, the forward optical assembly 902, the forward optical assembly 910, the left optical element 816, and the right optical element 822 may provide an optical engine of the glasses 800. The glasses 800 use the optical engine to generate an overlay of the real-world view of the user including display of a three-dimensional user interface to the user of the glasses 800.

It will be appreciated however that other display technologies or configurations may be utilized within an optical engine to display an image to a user in the user's field of view. For example, instead of a projector 904 and a waveguide, an LCD, LED or other display panel or surface may be provided.

In use, a user of the glasses 800 will be presented with information, content and various three-dimensional user interfaces on the near eye displays. As described in more detail elsewhere herein, the user can then interact with a device such as the glasses 800 using a touchpad 824 and/or the buttons 826, voice inputs or touch inputs on an associated device (e.g., the user device 738 shown in FIG. 7), and/or hand movements, locations, and positions detected by the glasses 800.

Figure 10:
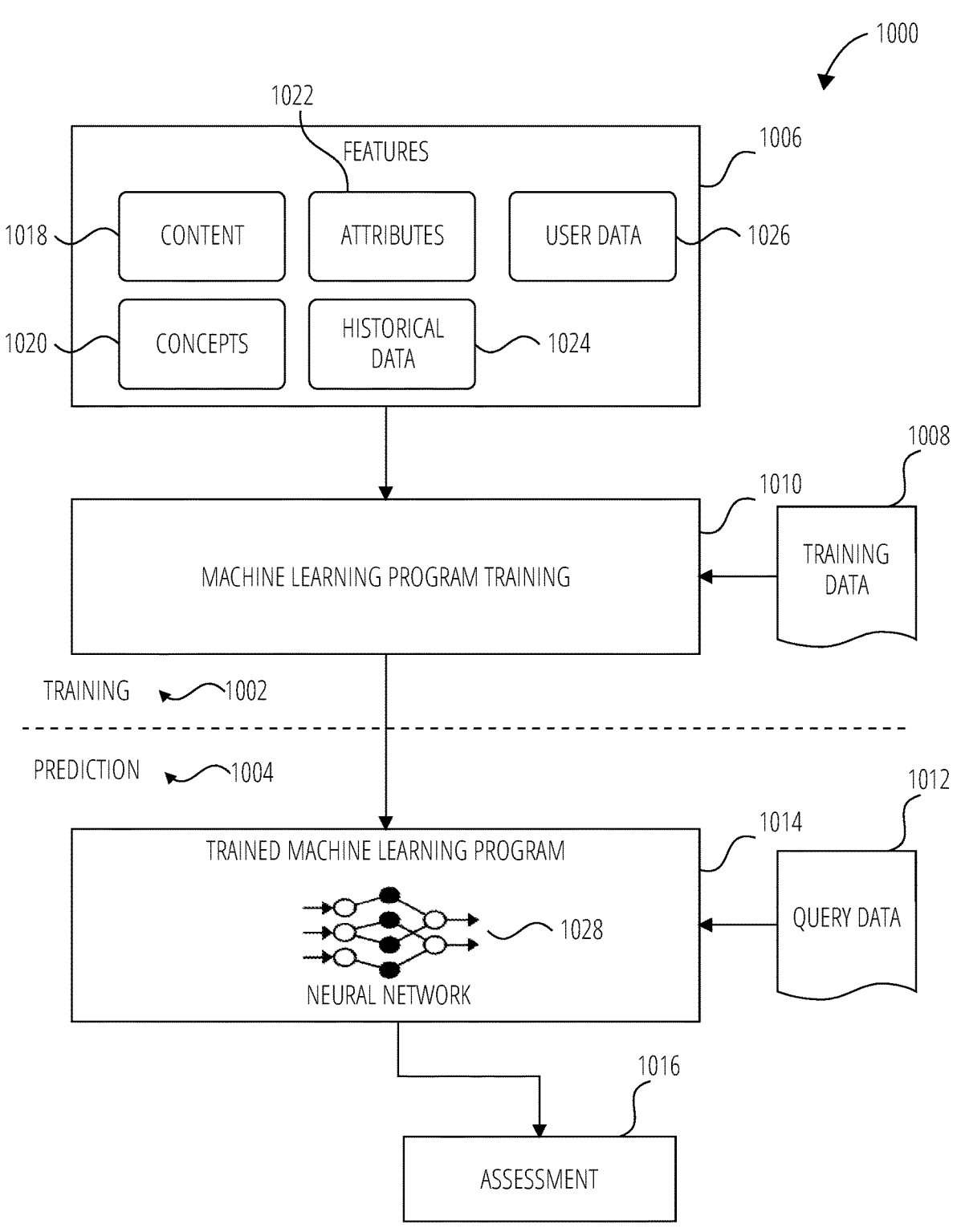
FIG. 10 illustrates training and use of a machine learning program, according to some examples.

FIG. 10 is a block diagram showing a machine learning program 1000, according to some examples. The machine learning programs 1000, also referred to as machine learning algorithms or tools, are used as part of the systems described herein to perform one or more operations, e.g., generating consolidated tracking data or determining a pose of an XR device.

Machine learning is a field of study that gives computers the ability to learn without being explicitly programmed. Machine learning explores the study and construction of algorithms, also referred to herein as tools, that may learn from or be trained using existing data and make predictions about or based on new data. Such machine learning tools operate by building a model from example training data 1008 in order to make data-driven predictions or decisions expressed as outputs or assessments (e.g., assessment 1016). Although examples are presented with respect to a few machine learning tools, the principles presented herein may be applied to other machine learning tools.

In some examples, different machine learning tools may be used. For example, Logistic Regression (LR), Naive-Bayes, Random Forest (RF), neural networks (NN), matrix factorization, and Support Vector Machines (SVM) tools may be used.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine learning program 1000 supports two types of phases, namely training phases 1002 and prediction phases 1004. In training phases 1002, supervised learning, unsupervised or reinforcement learning may be used. For example, the machine learning program 1000 (1) receives features 1006 (e.g., as structured or labeled data in supervised learning) and/or (2) identifies features 1006 (e.g., unstructured or unlabeled data for unsupervised learning) in training data 1008. In prediction phases 1004, the machine learning program 1000 uses the features 1006 for analyzing query data 1012 to generate outcomes or predictions, as examples of an assessment 1016.

In the training phase 1002, feature engineering is used to identify features 1006 and may include identifying informative, discriminating, and independent features for the effective operation of the machine learning program 1000 in pattern recognition, classification, and regression. In some examples, the training data 1008 includes labeled data, which is known data for pre-identified features 1006 and one or more outcomes. Each of the features 1006 may be a variable or attribute, such as individual measurable property of a process, article, system, or phenomenon represented by a data set (e.g., the training data 1008). Features 1006 may also be of different types, such as numeric features, strings, and graphs, and may include one or more of content 1018, concepts 1020, attributes 1022, historical data 1024 and/or user data 1026, merely for example.

The concept of a feature in this context is related to that of an explanatory variable used in statistical techniques such as linear regression. Choosing informative, discriminating, and independent features is important for the effective operation of the machine learning program 1000 in pattern recognition, classification, and regression. Features may be of different types, such as numeric features, strings, and graphs.

In training phases 1002, the machine learning program 1000 uses the training data 1008 to find correlations among the features 1006 that affect a predicted outcome or assessment 1016.

With the training data 1008 and the identified features 1006, the machine learning program 1000 is trained during the training phase 1002 at machine learning program training 1010. The machine learning program 1000 appraises values of the features 1006 as they correlate to the training data 1008. The result of the training is the trained machine learning program 1014 (e.g., a trained or learned model).

Further, the training phases 1002 may involve machine learning, in which the training data 1008 is structured (e.g., labeled during preprocessing operations), and the trained machine learning program 1014 implements a relatively simple neural network 1028 capable of performing, for example, classification and clustering operations. In other examples, the training phase 1002 may involve deep learning, in which the training data 1008 is unstructured, and the trained machine learning program 1014 implements a deep neural network 1028 that is able to perform both feature extraction and classification/clustering operations.

A neural network 1028 generated during the training phase 1002, and implemented within the trained machine learning program 1014, may include a hierarchical (e.g., layered) organization of neurons. For example, neurons (or nodes) may be arranged hierarchically into a number of layers, including an input layer, an output layer, and multiple hidden layers. Each of the layers within the neural network 1028 can have one or many neurons and each of these neurons operationally computes a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which defines the influence of the input from a transmitting neuron to a receiving neuron.

In some examples, the neural network 1028 may also be one of a number of different types of neural networks, including a single-layer feed-forward network, an Artificial Neural Network (ANN), a Recurrent Neural Network (RNN), a transformer, a symmetrically connected neural network, and unsupervised pre-trained network, a Convolutional Neural Network (CNN), or a Recursive Neural Network (RNN), merely for example.

During prediction phases 1004, the trained machine learning program 1014 is used to perform an assessment. Query data 1012 is provided as an input to the trained machine learning program 1014, and the trained machine learning program 1014 generates the assessment 1016 as output, responsive to receipt of the query data 1012.

Figure 11:
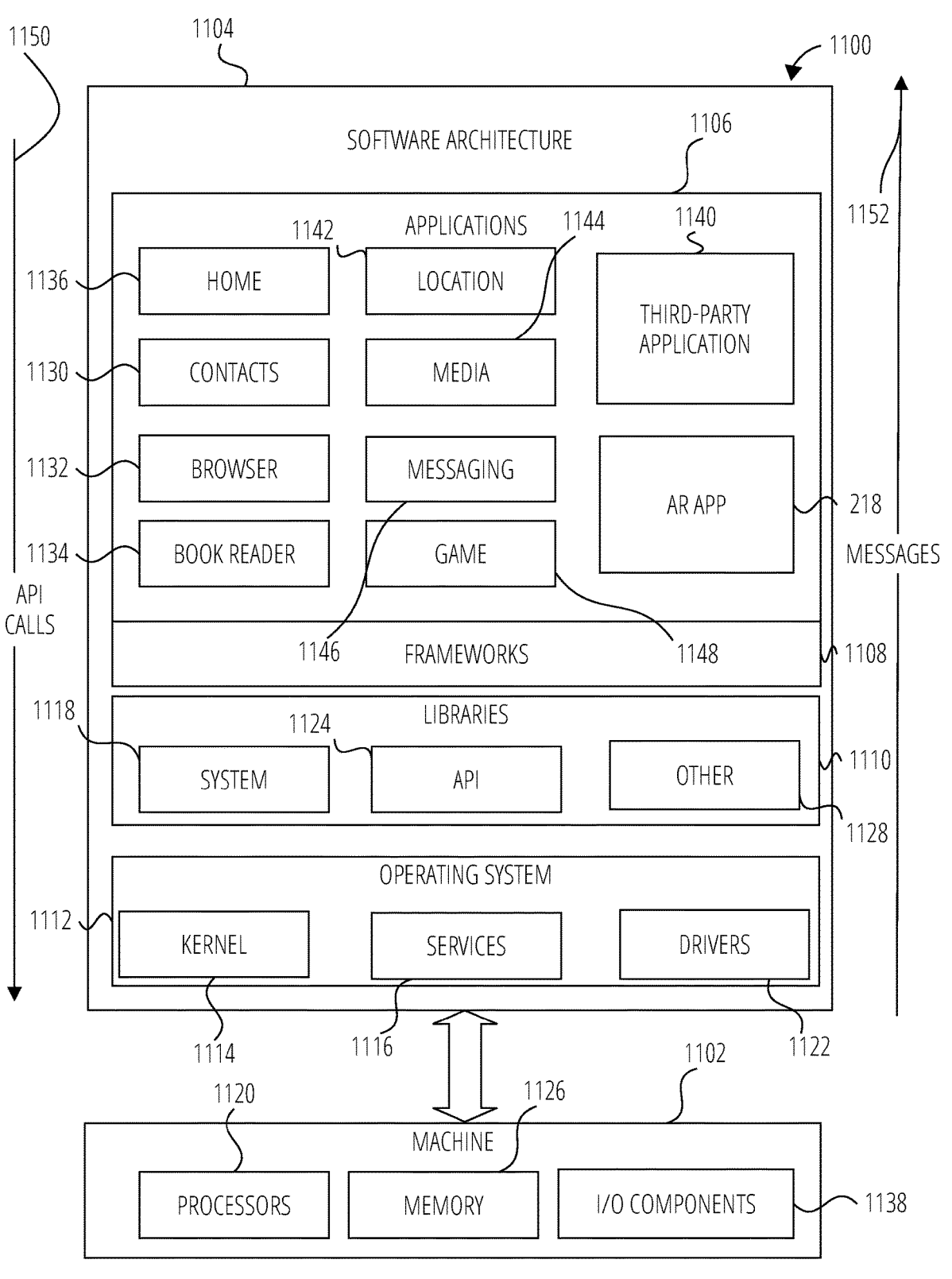
FIG. 11 is block diagram showing a software architecture within which the present disclosure may be implemented, according to some examples.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, Bluetooth™ or Bluetooth™ Low Energy drivers, flash memory drivers, serial communication drivers (e.g., Universal Serial Bus (USB) drivers), WI-FI™ drivers, audio drivers, power management drivers, and so forth.

The libraries 1110 provide a low-level common infrastructure used by the applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a high-level common infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In some examples, the applications 1106 may include a home application 1136, a contacts application 1130, a browser application 1132, a book reader application 1134, a location application 1142, a media application 1144, a messaging application 1146, a game application 1148, and a broad assortment of other applications such as a third-party application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In some examples, the third-party application 1140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In FIG. 11, the third-party application 1140 can invoke the API calls 1150 provided by the operating system 1112 to facilitate functionality described herein. The applications 1106 may include an AR application such as the AR application 218 described herein, according to some examples.

Figure 12:
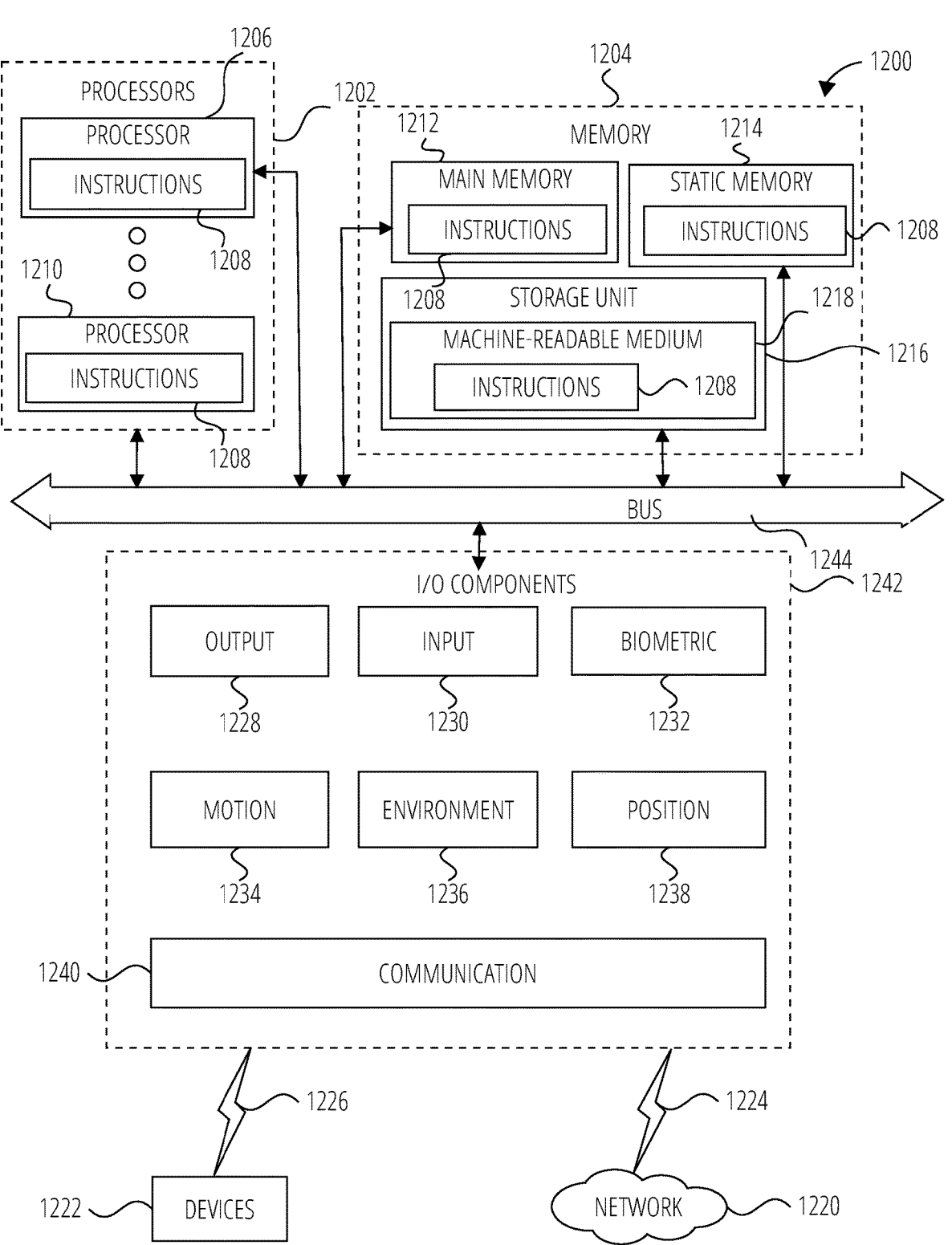
FIG. 12 is a diagrammatic representation of a machine in the form of a computer system within which a set of instructions may be executed for causing the machine to perform any one or more of the methodologies discussed herein, according to some examples.

FIG. 12 is a diagrammatic representation of a machine 1200 within which instructions 1208 (e.g., software, a program, an application, an applet, an app, or other executable code) for causing the machine 1200 to perform any one or more of the methodologies discussed herein may be executed. For example, the instructions 1208 may cause the machine 1200 to execute any one or more of the methods described herein. The instructions 1208 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), XR device, VR device, a smart home device (e.g., a smart appliance), other smart devices, a web appliance, a network router, a network switch, a network bridge, or any machine capable of executing the instructions 1208, sequentially or otherwise, that specify actions to be taken by the machine 1200. Further, while only a single machine 1200 is illustrated, the term "machine" shall also be taken to include a collection of machines that individually or jointly execute the instructions 1208 to perform any one or more of the methodologies discussed herein.

The machine 1200 may include processors 1202, memory 1204, and I/O components 1242, which may be configured to communicate with each other via a bus 1244. In some examples, the processors 1202 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1206 and a processor 1210 that execute the instructions 1208. The term "processor" is intended to include multi-core processors that may comprise two or more independent processors (sometimes referred to as "cores") that may execute instructions contemporaneously. Although FIG. 12 shows multiple processors 1202, the machine 1200 may include a single processor with a single core, a single processor with multiple cores (e.g., a multi-core processor), multiple processors with a single core, multiple processors with multiples cores, or any combination thereof.

The memory 1204 includes a main memory 1212, a static memory 1214, and a storage unit 1216, both accessible to the processors via the bus 1244. The main memory 1204, the static memory 1214, and storage unit 1216 store the instructions 1208 embodying any one or more of the methodologies or functions described herein. The instructions 1208 may also reside, completely or partially, within the main memory 1212, within the static memory 1214, within machine-readable medium 1218 within the storage unit 1216, within at least one of the processors, or any suitable combination thereof, during execution thereof by the machine 1200.

The I/O components 1242 may include a wide variety of components to receive input, provide output, produce output, transmit information, exchange information, capture measurements, and so on. The specific I/O components 1242 that are included in a particular machine will depend on the type of machine. For example, portable machines such as mobile phones may include a touch input device or other such input mechanisms, while a headless server machine will likely not include such a touch input device. It will be appreciated that the I/O components 1242 may include many other components that are not shown in FIG. 12. In various examples, the I/O components 1242 may include output components 1228 and input components 1230. The output components 1228 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1230 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In some examples, the I/O components 1242 may include biometric components 1232, motion components 1234, environmental components 1236, or position components 1238, among a wide array of other components. For example, the biometric components 1232 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1234 include acceleration sensor components (e.g., accelerometer), gravitation sensor components, rotation sensor components (e.g., gyroscope), and so forth. The environmental components 1236 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 include location sensor components (e.g., a GPS receiver components), altitude sensor components (e.g., altimeters or barometers that detect air pressure from which altitude may be derived), orientation sensor components (e.g., magnetometers), and the like.

Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

Communication may be implemented using a wide variety of technologies. The I/O components 1242 further include communication components 1240 operable to couple the machine 1200 to a network 1220 or devices 1222 via a coupling 1224 and a coupling 1226, respectively. For example, the communication components 1240 may include a network interface component or another suitable device to interface with the network 1220. In further examples, the communication components 1240 may include wired communication components, wireless communication components, cellular communication components, Near Field Communication (NFC) components, Bluetooth™ components, Wi-Fi™ components, and other communication components to provide communication via other modalities. The devices 1222 may be another machine or any of a wide variety of peripheral devices (e.g., a peripheral device coupled via a USB).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an image sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as location via Internet Protocol (IP) geolocation, location via Wi-Fi® signal triangulation, location via detecting an NFC beacon signal that may indicate a particular location, and so forth.

The various memories (e.g., memory 1204, main memory 1212, static memory 1214, and/or memory of the processors 1202) and/or storage unit 1216 may store one or more sets of instructions and data structures (e.g., software) embodying or used by any one or more of the methodologies or functions described herein. These instructions (e.g., the instructions 1208), when executed by processors 1202, cause various operations to implement the disclosed examples.

The instructions 1208 may be transmitted or received over the network 1220, using a transmission medium, via a network interface device (e.g., a network interface component included in the communication components 1240) and using any one of a number of well-known transfer protocols (e.g., hypertext transfer protocol (HTTP)). Similarly, the instructions 1208 may be transmitted or received using a transmission medium via the coupling 1226 (e.g., a peer-to-peer coupling) to the devices 1222.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks.

The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine 1200, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Although aspects have been described with reference to specific examples, it will be evident that various modifications and changes may be made to these examples without departing from the broader scope of the present disclosure. Accordingly, the specification and drawings are to be regarded in an illustrative rather than a restrictive sense. The accompanying drawings that form a part hereof, show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof.

Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

The various features, steps, operations, and processes described herein may be used independently of one another, or may be combined in various ways. All possible combinations and subcombinations are intended to fall within the scope of this disclosure. In addition, certain method or process blocks or operations may be omitted in some implementations.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in examples for the purpose of streamlining the disclosure. This method of disclosure is not to be interpreted as reflecting an intention that the examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example.

EXAMPLES

In view of the above-described implementations of subject matter this application discloses the following list of examples, wherein one feature of an example in isolation, or more than one feature of an example taken in combination, and, optionally, in combination with one or more features of one or more further examples, are further examples also falling within the disclosure of this application.

Example 1 is a method performed by an extended reality (XR) device that is located in and movable relative to a vehicle, the method comprising: generating device tracking data; accessing vehicle tracking data generated by an external sensor configured to measure motion of the vehicle; generating, based on the device tracking data and the vehicle tracking data, consolidated tracking data; and determining a pose of the XR device by using the consolidated tracking data.

In Example 2, the subject matter of Example 1 includes, wherein the determining of the pose of the XR device comprises determining a position and orientation of the XR device relative to the vehicle along six degrees of freedom.

In Example 3, the subject matter of any one of Examples 1-2 includes, rendering virtual content for presentation on a display of the XR device by using the pose of the XR device.

In Example 4, the subject matter of any one of Example 1-3 includes, wherein the virtual content comprises an augmentation, and wherein rendering the virtual content for presentation on the display of the XR device by using the pose of the XR device comprises: accessing an image captured by a camera of the XR device, the image comprising a scene including an object positioned inside of the vehicle; locating the object relative to a field of view of the display of the XR device by using the pose of the XR device; rendering, based on the locating of the object, the augmentation with respect to the object; and causing presentation of the augmentation on the display of the XR device.

In Example 5, the subject matter of any one of Examples 1~4 includes, wherein the XR device includes an image sensor and an inertial sensor, the device tracking data comprising device image data and device inertial data.

In Example 6, the subject matter of any one of Examples 1-5 includes, wherein the image sensor is a camera of the XR device, and wherein the inertial sensor is an Inertial Measurement Unit (IMU) of the XR device.

In Example 7, the subject matter of any one of Examples 1-6 includes, detecting an inconsistency between the device image data and the device inertial data, wherein the generating of the consolidated tracking data comprises automatically applying the vehicle tracking data to resolve the inconsistency between the device image data and the device inertial data.

In Example 8, the subject matter of any one of Examples 1-7 includes, in response to detecting of the inconsistency between the device image data and the device inertial data, causing activation of a tracking mode of the external sensor in which the external sensor generates the vehicle tracking data.

In Example 9, the subject matter of any one of Examples 1-8 includes, wherein the accessing of the vehicle tracking data comprises: receiving a real-time stream of measurement data from the external sensor; and obtaining the vehicle tracking data from the real-time stream of measurement data.

In Example 10, the subject matter of any one of Examples 1-9 includes, prior to the generating of the consolidated tracking data: synchronizing the device tracking data with the vehicle tracking data.

In Example 11, the subject matter of any one of Examples 1-10 includes, wherein the external sensor comprises an Inertial Measurement Unit (IMU), and wherein the vehicle tracking data comprises vehicle inertial data.

In Example 12, the subject matter of any one of Examples 1-11 includes, wherein the vehicle tracking data further comprises sensor pose data that is indicative of a pose of the external sensor relative to the vehicle.

In Example 13, the subject matter of any one of Examples 1-12 includes, wherein the external sensor is attached to the vehicle.

In Example 14, the subject matter of any one of Examples 1-13 includes, wherein the generating of the consolidated tracking data comprises: analyzing differences between the device tracking data and the vehicle tracking data; and generating, based at least partially on the differences, the consolidated tracking data.

In Example 15, the subject matter of any one of Examples 1-14 includes, detecting a predefined motion of the vehicle; and in response to detecting of the predefined motion of the vehicle, activating a tracking mode of the external sensor in which the external sensor generates the vehicle tracking data.

In Example 16, the subject matter of any one of Examples 1-15 includes, wherein the external sensor is selected from the group consisting of: a sensor located in an XR device case; a sensor of a mobile device that is communicatively coupled to the XR device; a sensor attached to an adhesive component; a sensor attached to a magnetic coupling component; a sensor attached to a mechanical coupling component; a sensor attached to a vehicle-mountable component; and an on-board sensor of the vehicle.

In Example 17, the subject matter of any one of Examples 1-16 includes, wherein the XR device is a head-wearable apparatus worn by a user inside of the vehicle.

In Example 18, the subject matter of any one of Examples 1-17 includes, wherein the XR device accesses the vehicle tracking data by communicating with the external sensor using a wireless communication protocol comprising at least one of: Wi-Fi, Bluetooth, Radio Frequency (RF), or Ultra-wideband (UWB).

Example 19 is an extended reality (XR) device comprising: at least one memory that stores instructions; and at least one processor configured by the instructions to perform operations comprising, when the XR device is located in and movable relative to a vehicle: generating device tracking data; accessing vehicle tracking data generated by an external sensor configured to measure motion of the vehicle; generating, based on the device tracking data and the vehicle tracking data, consolidated tracking data; and determining a pose of the XR device by using the consolidated tracking data.

Example 20 is a non-transitory computer-readable storage medium, the computer-readable storage medium including instructions that when executed by at least one processor of an extended reality (XR) device that is located in and movable relative to a vehicle, cause the at least one processor to perform operations comprising: generating device tracking data; accessing vehicle tracking data generated by an external sensor configured to measure motion of the vehicle; generating, based on the device tracking data and the vehicle tracking data, consolidated tracking data; and determining a pose of the XR device by using the consolidated tracking data.

Example 21 is at least one machine-readable medium including instructions that, when executed by processing circuitry, cause the processing circuitry to perform operations to implement any one of Examples 1-20.

Example 22 is an apparatus comprising means to implement any one of Examples 1-20.

Example 23 is a system to implement any one of Examples 1-20.

Example 24 is a method to implement any one of Examples 1-20.

What is claimed is:

1. A method performed by an extended reality (XR) device that is located in and movable relative to a vehicle, the XR device including at least one image sensor and at least one inertial sensor, and the method comprising:
  generating device tracking data comprising device image data and device inertial data, the device image data generated using the at least one image sensor of the XR device and the device inertial data generated using the at least one inertial sensor of the XR device;
  detecting an inconsistency between the device image data and the device inertial data;
  based on the detecting of the inconsistency between the device image data and the device inertial data, causing activation of a tracking mode of an external sensor to generate vehicle tracking data;
  accessing the vehicle tracking data generated by the external sensor;

generating, based on the device tracking data generated by the XR device and the vehicle tracking data generated by the external sensor, consolidated tracking data; and determining a pose of the XR device based on the consolidated tracking data.

2. The method of claim 1, wherein the determining of the pose of the XR device comprises determining a position and orientation of the XR device relative to the vehicle along six degrees of freedom.

3. The method of claim 1, further comprising:
rendering virtual content for presentation on a display of the XR device by using the pose of the XR device.

4. The method of claim 3, wherein the at least one image sensor comprises a camera, wherein the virtual content comprises an augmentation, and wherein rendering the virtual content for presentation on the display of the XR device based on the pose of the XR device comprises:
accessing an image captured by the camera of the XR device, the image comprising a scene including an object positioned inside of the vehicle;
locating the object relative to a field of view of the display of the XR device by using the pose of the XR device;
rendering, based on the locating of the object, the augmentation with respect to the object; and
causing presentation of the augmentation on the display of the XR device.

5. The method of claim 1, wherein the at least one image sensor comprises a camera of the XR device, and wherein the at least one inertial sensor comprises an Inertial Measurement Unit (IMU) of the XR device.

6. The method of claim 1,
wherein the generating of the consolidated tracking data comprises automatically applying the vehicle tracking data to resolve the inconsistency between the device image data and the device inertial data.

7. The method of claim 1, wherein the accessing of the vehicle tracking data comprises:
receiving a real-time stream of measurement data from the external sensor; and
obtaining the vehicle tracking data from the real-time stream of measurement data.

8. The method of claim 1, further comprising, prior to the generating of the consolidated tracking data:
synchronizing the device tracking data with the vehicle tracking data.

9. The method of claim 1, wherein the external sensor comprises an Inertial Measurement Unit (IMU), and wherein the vehicle tracking data comprises vehicle inertial data.

10. The method of claim 9, wherein the vehicle tracking data further comprises sensor pose data that is indicative of a pose of the external sensor relative to the vehicle.

11. The method of claim 1, wherein the external sensor is attached to the vehicle.

12. The method of claim 1, wherein the generating of the consolidated tracking data comprises:
analyzing differences between the device tracking data and the vehicle tracking data; and
generating, based at least partially on the differences, the consolidated tracking data.

13. The method of claim 1,
wherein the tracking mode of the external sensor in which the external sensor generates the vehicle tracking data is further activated based on detection of a predefined motion of the vehicle.

14. The method of claim 1, wherein the external sensor is selected from the group consisting of: a sensor located in an XR device case; a sensor of a mobile device that is communicatively coupled to the XR device; a sensor attached to an adhesive component; a sensor attached to a magnetic coupling component; a sensor attached to a mechanical coupling component, a sensor attached to a vehicle-mountable component; and an on-board sensor of the vehicle.

15. The method of claim 1, wherein the XR device is a head-wearable apparatus worn by a user inside of the vehicle.

16. The method of claim 1, wherein the XR device accesses the vehicle tracking data by communicating with the external sensor using a wireless communication protocol comprising at least one of: Wi-Fi, Bluetooth, Radio Frequency (RF), or Ultra-wideband (UWB).

17. An extended reality (XR) device comprising:
at least one image sensor
at least one inertial sensor;
at least one memory that stores instructions; and
at least one processor configured by the instructions to perform operations comprising, when the XR device is located in and movable relative to a vehicle:
generating device tracking data comprising device image data and device inertial data, the device image data generated using the at least one image sensor of the XR device and the device inertial data generated using the at least one inertial sensor of the XR device;
detecting an inconsistency between the device image data and the device inertial data;
based on the detecting of the inconsistency between the device image data and the device inertial data, causing activation of a tracking mode of an external sensor to generate vehicle tracking data;
accessing the vehicle tracking data generated by the external sensor;
generating, based on the device tracking data generated by the XR device and the vehicle tracking data generated by the external sensor, consolidated tracking data; and
determining a pose of the XR device based on the consolidated tracking data.

18. A non-transitory computer-readable storage medium, the computer-readable storage medium including instructions that when executed by at least one processor of an extended reality (XR) device that is located in and movable relative to a vehicle, cause the at least one processor to perform operations comprising:
generating device tracking data, the XR device including at least one image sensor and at least one inertial sensor, and the device tracking data comprising device image data and device inertial data, the device image data generated using the at least one image sensor of the XR device and the device inertial data generated using the at least one inertial sensor of the XR device;
detecting an inconsistency between the device image data and the device inertial data;
based on the detecting of the inconsistency between the device image data and the device inertial data, causing activation of a tracking mode of an external sensor to generate vehicle tracking data;
accessing the vehicle tracking data generated by the external sensor;
generating, based on the device tracking data generated by the XR device and the vehicle tracking data generated by the external sensor, consolidated tracking data; and
determining a pose of the XR device based on the consolidated tracking data.

19. The XR device of claim 17, wherein the external sensor comprises an Inertial Measurement Unit (IMU), and wherein the vehicle tracking data comprises vehicle inertial data.

20. The XR device of claim 19, wherein the vehicle tracking data further comprises sensor pose data that is indicative of a pose of the external sensor relative to the vehicle.

\* \* \* \* \*